US012618973B2

(12) United States Patent
Mahara

(10) Patent No.: US 12,618,973 B2
(45) Date of Patent: May 5, 2026

(54) DISTANCE MEASURING DEVICE AND DISTANCE MEASURING METHOD

(71) Applicant: SONY SEMICONDUCTOR SOLUTIONS CORPORATION, Kanagawa (JP)

(72) Inventor: Kumiko Mahara, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 867 days.

(21) Appl. No.: 17/907,552

(22) PCT Filed: Mar. 25, 2021

(86) PCT No.: PCT/JP2021/012468
§ 371 (c)(1),
(2) Date: Sep. 28, 2022

(87) PCT Pub. No.: WO2021/205888

PCT Pub. Date: Oct. 14, 2021

(65) Prior Publication Data

US 2023/0146183 A1 May 11, 2023

(30) Foreign Application Priority Data

Apr. 8, 2020 (JP) ................................. 2020-069486

(51) Int. Cl.
*G01S 17/00* (2020.01)
*G01S 7/4914* (2020.01)
(Continued)

(52) U.S. Cl.
CPC ............ *G01S 17/32* (2013.01); *G01S 7/4914* (2013.01); *G01S 7/4915* (2013.01); *G01S 17/89* (2013.01)

(58) Field of Classification Search
CPC .. G01S 17/32; G01S 17/4914; G01S 17/4915; G01S 17/89
See application file for complete search history.

(56) References Cited

U.S. PATENT DOCUMENTS

| | | | |
|---|---|---|---|
| 11,627,301 B2 * | 4/2023 | Jang ........................ | G01S 17/89 |
| | | | 348/46 |
| 11,726,185 B2 * | 8/2023 | Meynants ............... | G01S 17/42 |
| | | | 356/5.01 |

(Continued)

FOREIGN PATENT DOCUMENTS

| | | |
|---|---|---|
| JP | 2011-086904 A | 4/2011 |
| JP | 2018-194501 A | 12/2018 |

(Continued)

OTHER PUBLICATIONS

Okino et al. 200x900 6μm 450fps Geiger-Mode Vertical Avalanche Photodiodes CMOS Image Sensor for a 250m Time-of-Flight Ranging System Using Direct-Indirect-Mixed Frame Synthesis with Configurable-Depth-Resolution Down to 10cm (Year: 2020).*

(Continued)

*Primary Examiner* — Gerald J Sufleta, II
(74) *Attorney, Agent, or Firm* — CHIP LAW GROUP

(57) ABSTRACT

The present disclosure relates to a distance measuring device and a distance measuring method enabling use of a plurality of sensors employing different distance measurement schemes in combination at low cost. A pixel region including a pixel including a SPAD to be used for distance measurement using a direct ToF scheme and a pixel including a current assisted photonic demodulator (CAPD) to be used for distance measurement using an indirect ToF scheme or a normal pixel, and a light emitting unit are shared and controlled. The present disclosure can be applied to a distance measuring device.

19 Claims, 26 Drawing Sheets

(51) Int. Cl.
G01S 7/4915 (2020.01)
G01S 17/32 (2020.01)
G01S 17/89 (2020.01)

(56) References Cited

U.S. PATENT DOCUMENTS

2016/0327638 A1 11/2016 Dielacher et al.
2018/0247422 A1 8/2018 Alibay et al.

FOREIGN PATENT DOCUMENTS

WO 2014/122714 A1 8/2014
WO 2018/061508 A1 4/2018
WO 2018/074530 A1 4/2018

OTHER PUBLICATIONS

Shota, et al., "A 1200x900 6μm 450fps Geiger-Mode Vertical Avalanche Photodiodes CMOS Image Sensor for a 250m Time-of-Flight Raging System Using Direct-Indirect-Mixed Frame Synthesis with Configurable-Depth-Resolution Down to 10cm", ITE Technical Report, ISSN 1342-6893, vol. 44, No. 11, Mar. 20, 2020, pp. 17-20. Translation of Abstract only.
International Search Report and Written Opinion of PCT Application No. PCT/JP2021/012468, issued on Jun. 1, 2021, 11 pages of ISRWO.

* cited by examiner

*FIG. 3*

DISTANCE MEASURING DEVICE

71

LIGHT EMITTING UNIT 84

LD 83 iToF SENSOR 81 dToF SENSOR 82

DISTANCE MEASURING DEVICE AND DISTANCE MEASURING METHOD

CROSS REFERENCE TO RELATED APPLICATIONS

This application is a U.S. National Phase of International Patent Application No. PCT/JP2021/012468 filed on Mar. 25, 2021, which claims priority benefit of Japanese Patent Application No. JP 2020-069486 filed in the Japan Patent Office on Apr. 8, 2020. Each of the above-referenced applications is hereby incorporated herein by reference in its entirety.

TECHNICAL FIELD

The present disclosure relates to a distance measuring device and a distance measuring method, and more particularly to a distance measuring device and a distance measuring method that enabled use of a plurality of sensors employing different distance measurement schemes in combination at low cost.

BACKGROUND ART

In recent years, as a distance measurement scheme that has attracted attention, a distance measuring sensor that measures a distance using a Time-of-Flight (ToF) method has attracted attention.

Distance measuring sensors include a sensor employing a direct ToF scheme capable of measuring a long distance and a sensor employing an indirect ToF scheme capable of measuring a relatively short distance with high accuracy.

For example, Patent Document 1 discloses a distance measuring sensor employing the direct ToF scheme.

In addition, Patent Document 2 discloses a distance measuring sensor employing the indirect ToF scheme.

CITATION LIST

Patent Document

Patent Document 1: International Publication No. 2018/074530
Patent Document 2: Japanese Patent Application Laid-Open No. 2011-86904

SUMMARY OF THE INVENTION

Problems to be Solved by the Invention

By the way, in a configuration of a distance measuring device, use of a plurality of distance measuring sensors employing different distance measurement schemes makes it possible to cover a wide distance measurement range.

However, if a distance measuring sensor employing a direct ToF scheme and a distance measuring sensor employing an indirect ToF scheme are simply combined, a device scale increases and cost increases.

The present disclosure has been made in view of such a situation and is particularly directed to enabling use of a plurality of sensors employing different distance measurement schemes in combination at low cost.

Solutions to Problems

A distance measuring device according to one aspect of the present disclosure is a distance measuring device including: a light emitting unit configured to emit distance measurement light; a pixel region including a first pixel to be used for distance measurement using a first time of flight (ToF) scheme and a second pixel to be used for distance measurement using a second ToF scheme; and a control unit configured to control the first pixel, the second pixel, and the light emitting unit.

A distance measuring method according to one aspect of the present disclosure is a distance measuring method of a distance measuring device including: a light emitting unit configured to emit distance measurement light; a pixel region including a first pixel to be used for distance measurement using a first time of flight (ToF) scheme and a second pixel to be used for distance measurement using a second ToF scheme; and a control unit configured to control the first pixel, the second pixel, and the light emitting unit, the distance measuring method including a step of the control unit controlling the first pixel, the second pixel, and the light emitting unit.

In one aspect of the present disclosure, a light emitting unit configured to emit distance measurement light, a first pixel and a second pixel in a pixel region including the first pixel to be used for distance measurement using a first time of flight (ToF) scheme, and the second pixel to be used for distance measurement using a second ToF scheme are controlled.

BRIEF DESCRIPTION OF DRAWINGS

FIG. 3 is a view for explaining another configuration example of the distance measuring device including the iToF sensor and the dToF sensor.

FIG. 11 is a view illustrating a third configuration example of the pixel in the dTOF pixel region.

FIG. 12 is a view illustrating a fourth configuration example of the pixel in the dTOF pixel region.

FIG. 18 is a timing chart for explaining another operation of the distance measuring device in FIG. 6.

FIG. 24 is a view for explaining an example of variations of the i/d ToF sensor.

FIG. 25 is a view for explaining a first application example of the distance measuring device of the present disclosure.

MODE FOR CARRYING OUT THE INVENTION

Figure 1:
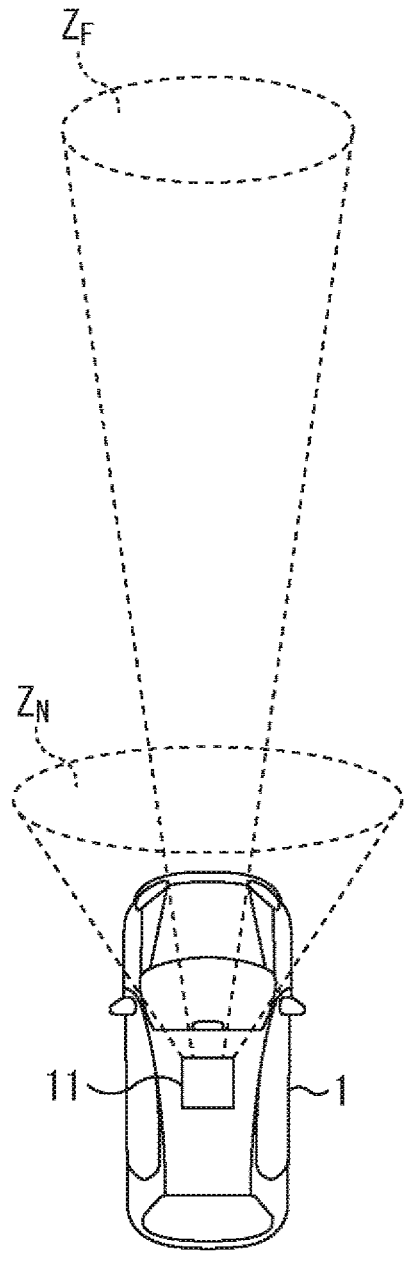
FIG. 1 is a view illustrating an example of a detection range in a case where a distance measuring device is mounted on a vehicle.

Preferred embodiments of the present disclosure will be described in detail below with reference to the accompanying drawings. Note that, in the present specification and the drawings, components having substantially the same functional configuration will be denoted by the same reference numerals, and redundant description will be omitted.

In addition, description will be given in the following order.

1. Outline of the present disclosure
2. First Embodiment
3. Second Embodiment

1. Outline of Present Disclosure

With reference to FIG. 1, outline of a distance measuring device of the present disclosure will be described using a distance measuring device to be mounted on a vehicle as an example.

As illustrated in a right part of FIG. 1, in a case where a distance measuring device 11 is mounted on a vehicle 1, it is necessary to enable measurement of a distance of an object in a region ZF to which a distance is longer than a predetermined distance from the vehicle 1 with respect to a traveling direction of the vehicle 1, which is an upper side in the drawing, for example, in order to take collision avoidance behavior in a situation of traveling at high speed.

In addition, in a case where the vehicle 1 travels, for example, in a narrow alley, or the like, where a pedestrian is walking with respect to a traveling direction that is an upper side in the drawing, it is necessary to enable measurement of a distance of an object in a region ZN to which a distance is shorter than a predetermined distance from the vehicle 1.

In a case where a distance measuring sensor employing a ToF scheme is used, in general, a distance measuring sensor employing a direct ToF scheme is used in a case where a far region of the vehicle 1 indicated by the region ZF in FIG. 1 is detected, and a distance measuring sensor employing an indirect ToF scheme is used in a case where a region in the vicinity of the vehicle 1 indicated by the region ZN in FIG. 1 is detected.

Hereinafter, the distance measuring sensor employing the direct ToF scheme will be referred to as a dToF sensor, and the distance measuring sensor employing the indirect ToF scheme will be referred to as an iToF sensor.

Here, the iToF sensor is a distance measuring sensor employing a scheme of detecting a flight time from a timing at which distance measurement light is emitted to a timing at which reflected light generated by the distance measurement light being reflected by an object is received as a phase difference and calculating a distance to the object, and can implement distance measurement in a range closer than a predetermined distance with high accuracy.

Furthermore, the dToF sensor is a distance measuring sensor that directly measures a flight time from a timing at which distance measurement light is emitted to a timing at which reflected light generated by the distance measurement light being reflected by an object is received and calculates a distance to the object, and can implement distance measurement in a range to which a distance is longer than a predetermined distance.

Thus, in order to implement distance measurement of an object in both the region ZF that is a region far from the vehicle 1 in FIG. 1 and the region ZN that is a region near the vehicle 1, the distance measuring device 11 including at least both the iToF sensor and the dToF sensor is required.

Figure 2:
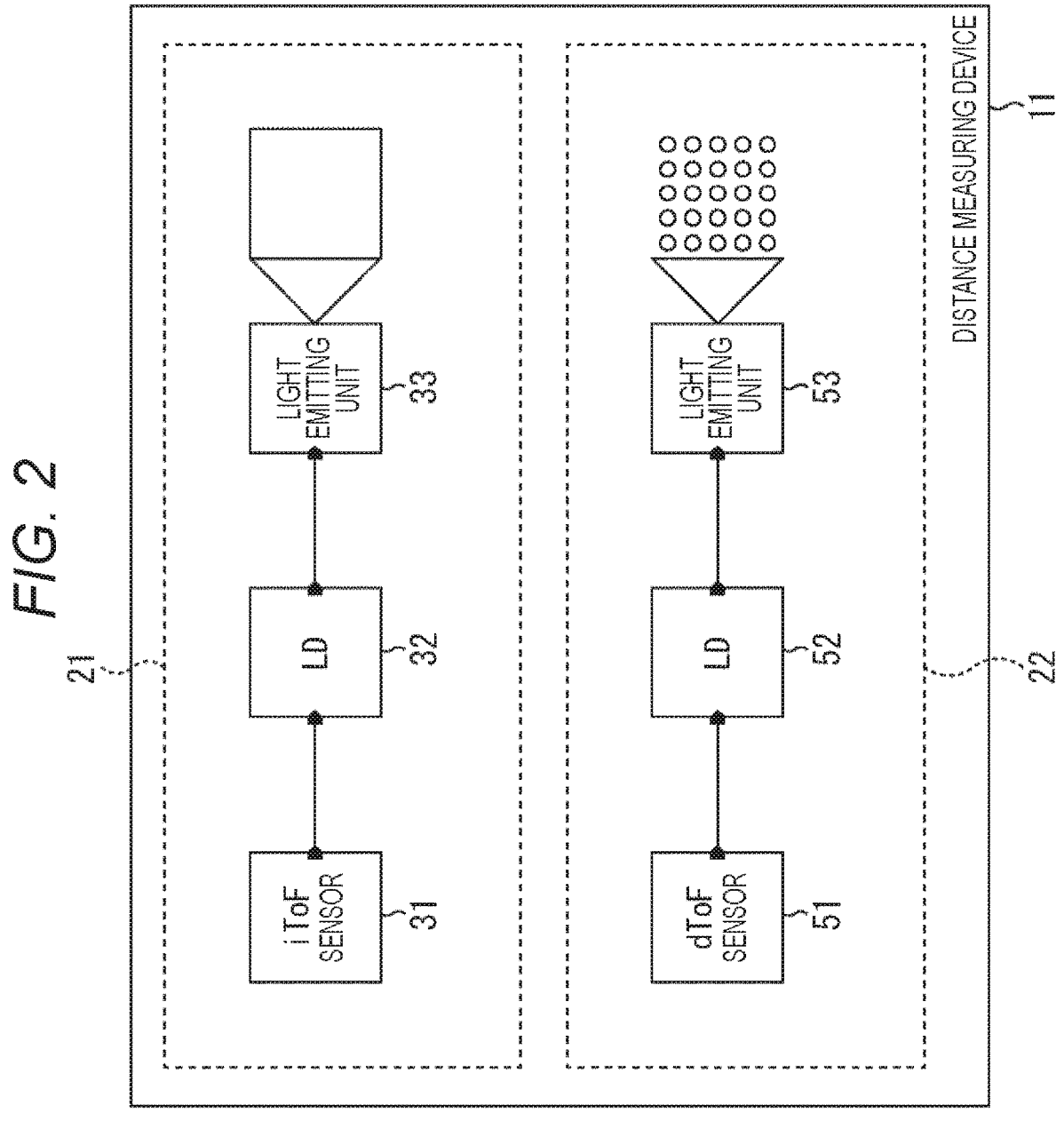
FIG. 2 is a view for explaining a configuration example of a distance measuring device including an iToF sensor and a dToF sensor.

Thus, in a case where both the iToF sensor and the dToF sensor are simply provided, the distance measuring device 11 has a configuration as illustrated in FIG. 2.

The distance measuring device 11 in FIG. 2 includes an iToF block 21 including an iToF sensor 31 and a dToF block 22 including a dToF sensor 51.

More specifically, the iToF block 21 includes the iToF sensor 31, a laser driver (LD) 32, and a light emitting unit 33.

The iToF sensor 31 includes a light receiving element such as a current assisted photonic demodulator (CAPD) and supplies a light emission trigger that instructs the light emitting unit 33 to emit light, to the LD 32.

The LD 32 continuously modulates the light emitting unit 33 including a vertical cavity surface emitting laser LED (VCSEL LED), or the like, at a predetermined high frequency on the basis of the light emission trigger and repeats light emission and extinction.

The iToF sensor 31 receives reflected light obtained by the distance measurement light emitted from the light emitting unit 33 being reflected by the object, detects a flight time from a timing at which the light emitting unit 33 is caused to emit light to a timing at which the reflected light obtained by the light emitted by the light emitting unit 33 being reflected by the object is received as a phase difference of light blinked and modulated at a predetermined high frequency of the light emitting unit 33 on the basis of the light emission trigger and calculates a distance to the object.

Furthermore, the dToF block 22 includes a dToF sensor 51, a laser driver (LD) 52, and a light emitting unit 53.

The dToF sensor 51 includes a light receiving element such as a single photon avalanche diode (SPAD) and supplies a light emission trigger that instructs the light emitting unit 53 to emit light, to the LD 52.

The LD 52 causes the light emitting unit 53 including a vertical cavity surface emitting laser LED (VCSEL LED), or the like, to emit light, for example, as spot light.

The dToF sensor 51 receives the reflected light obtained by the distance measurement light emitted from the light emitting unit 53 being reflected by the object, directly detects a flight time from a timing at which the light emitting unit 53 is caused to emit light to a timing at which the reflected light including the spot light obtained by the distance measurement light emitted from the light emitting unit 53 being reflected by the object is received on the basis of the light emission trigger and calculates a distance to the object.

However, in the distance measuring device 11 having the configuration in FIG. 2, each of the iToF block 21 and the dToF block 22 includes a sensor, an LD, and a light emitting unit, which increases a device configuration in size and increases cost.

Thus, it is conceivable to simplify the device configuration by sharing the LD and the light emitting unit between the iToF sensor and the dToF sensor.

Figure 3:
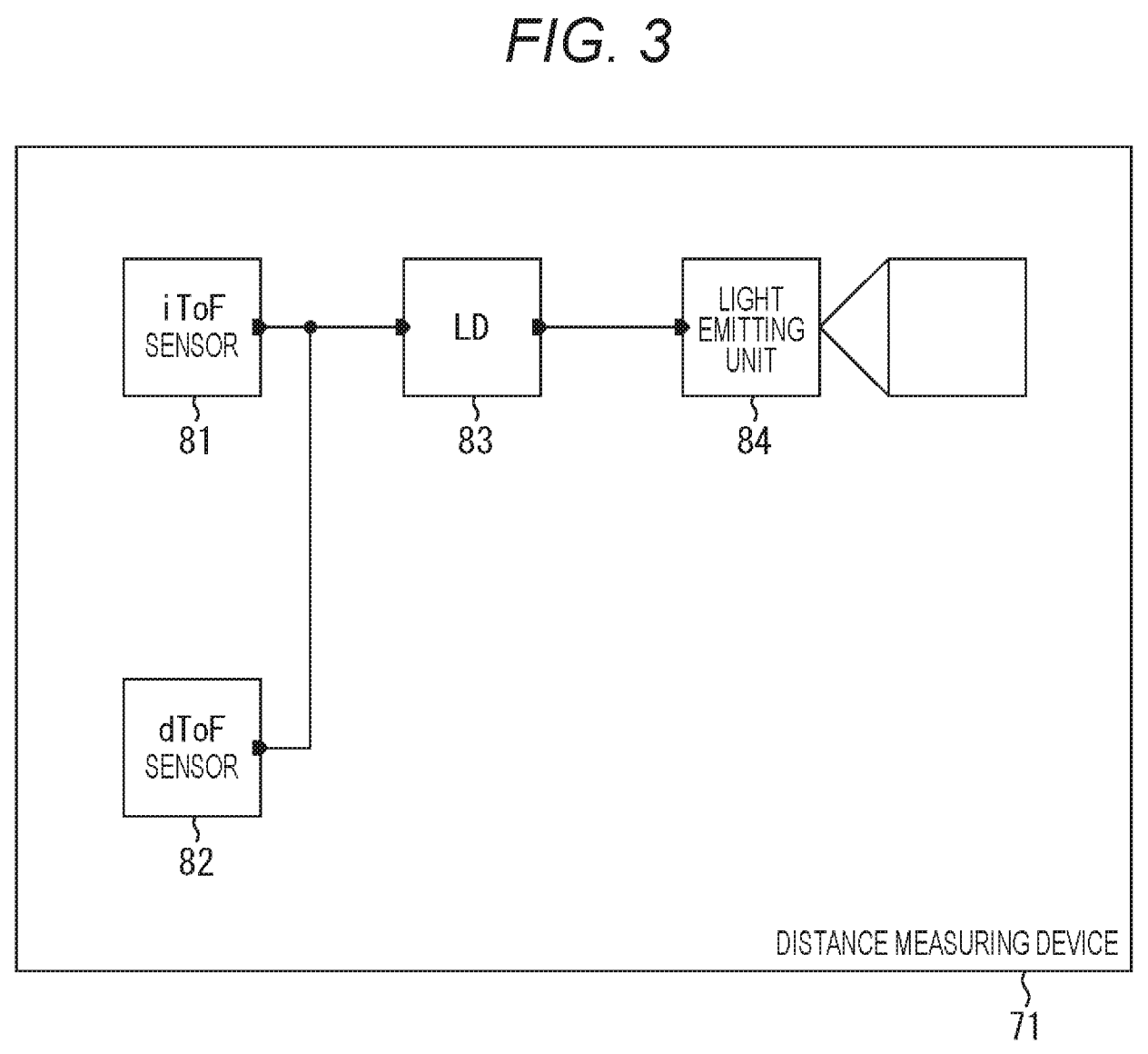

More specifically, as illustrated in FIG. 3, a distance measuring device 71 includes an iToF sensor 81, a dToF sensor 82, an LD 83, and a light emitting unit 84.

Note that the iToF sensor 81 and the dToF sensor 82 have configurations respectively corresponding to the iToF sensor 31 and the dToF sensor 51 in FIG. 2 and have the same functions.

The LDs 83 and the light emitting units 84 respectively correspond to the LDs 32 and 52 and the light emitting units 33 and 53 in FIG. 2.

If the light emission triggers from the iToF sensor 81 and the dToF sensor 82 are supplied to the LD 83, the LD 83 projects distance measurement light to a range in which distance measurement is performed by causing the light emitting unit 84 to emit light, and a flight time that is a difference between a light emission timing of the distance measurement light and a timing at which reflected light obtained by the distance measurement light being reflected by an object is received is measured to measure a distance to the object.

However, in a case where the iToF sensor 81 and the dToF sensor 82 receive reflected light from an object in the same region, while, in the iToF sensor 81, the flight time is detected from the phase difference by receiving high-frequency continuous modulation light, in the dToF sensor 82, the flight time is directly detected by receiving spot light.

For this reason, the iToF sensor 81 and the dToF sensor 82 have different frequencies of received light, interference occurs if light is projected simultaneously, so that it is necessary to operate the iToF sensor 81 and the dToF sensor 82 at different timings by time division processing.

Thus, it is conceivable that the iToF sensor 81 and the dToF sensor 82 control the LDs 83 by time division processing to cause the light emitting unit 84 to emit light and perform distance measurement at different timings.

However, in a case of the configuration in FIG. 3, the light emission trigger supplied from the iToF sensor 81 to the LD 83 is a high frequency signal, and thus, there is a possibility that appropriate distance measurement cannot be performed due to reflection occurring in a wiring to the dToF sensor 51 and deformation of a waveform of the light emission trigger, so that the LD and the light emitting unit cannot be simply shared.

Furthermore, as described with reference to FIG. 2, in a case where the iToF block 21 and the dToF block 22 are provided, and the iToF sensor 31 and the dToF sensor 51 are constituted independently, time division processing is performed on each other, which makes control complicated.

Figure 4:
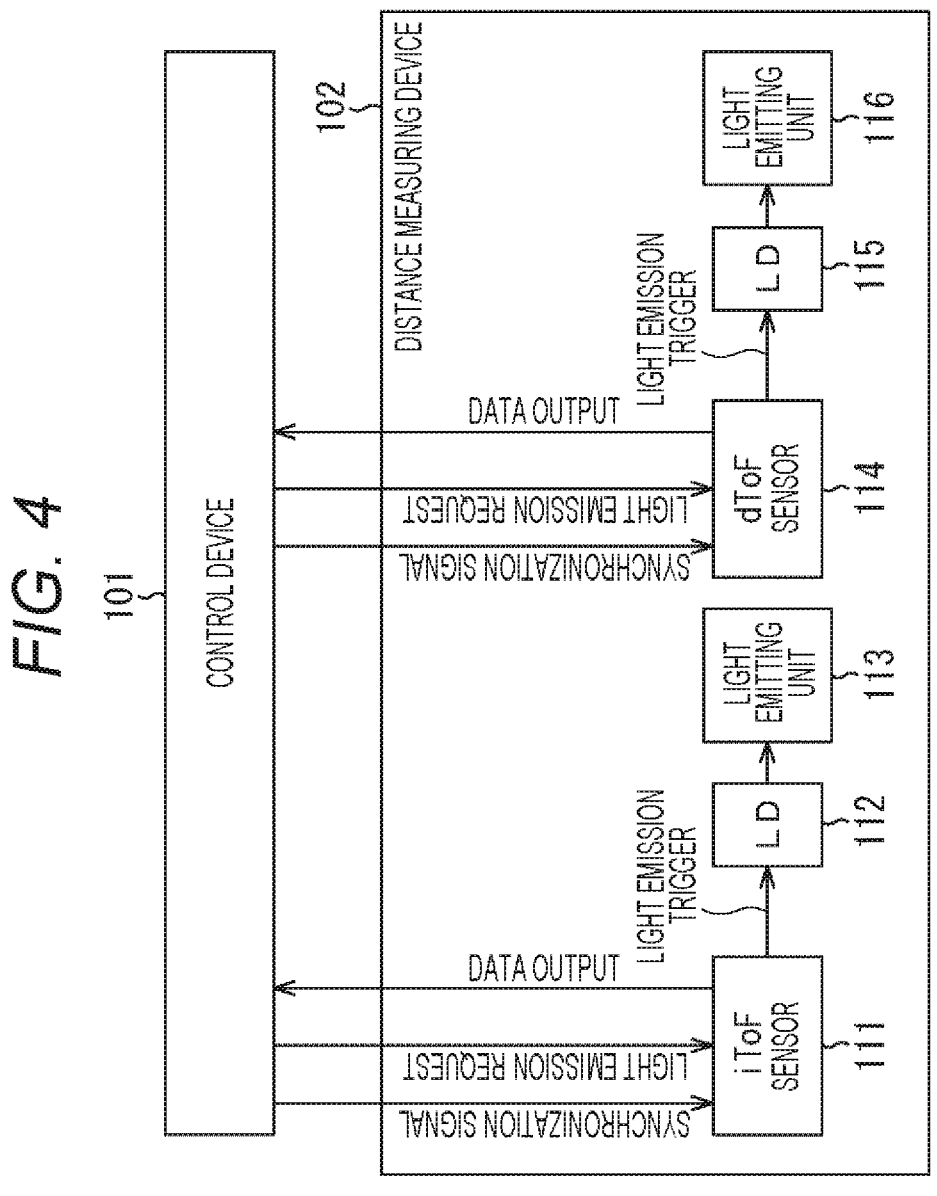
FIG. 4 is a view for explaining control of the distance measuring device including the iToF sensor and the dToF sensor.

For example, as illustrated in FIG. 4, a case will be considered in which a distance measuring device 102 including an iToF sensor 111, an LD 112, and a light emitting unit 113, and a dToF sensor 114, an LD 114, and a light emitting unit 115, in which two types of iToF sensors and dToF sensors are independently provided, is controlled by a control device 101.

Here, the iToF sensor 111, the LD 112, and the light emitting unit 113, and the dToF sensor 114, the LD 115, and the light emitting unit 116 have configurations corresponding to the iToF sensor 31, the LD 32, and the light emitting unit 33, and the dToF sensor 51, the LD 52, and the light emitting unit 53 in FIG. 1.

The control device 101 supplies a light emission request at different timings while supplying a synchronization signal to the iToF sensor 111 and the dToF sensor 114.

The iToF sensor 111 and the dToF sensor 114 generate a light emission trigger in response to the light emission request from the control device 101, control the LDs 112 and 115 and cause the light emitting units 113 and 116 to emit distance measurement light.

On the basis of the distance measurement light emitted from the light emitting units 113 and 116, the iToF sensor 111 and the dToF sensor 114 receive reflected light generated when the distance measurement light is reflected by an object, detect a flight time from a timing at which the light emission trigger is output to a timing at which the reflected light is received, and measure the distance.

Alternatively, the control device 101 supplies a synchronization signal to one of the iToF sensor and the dToF sensor 114 to supply a light emission request, and one of the iToF sensor 111 and the dToF sensor that has received the light emission request causes the light emitting units 113 and 116 to emit distance measurement light and receives reflected light from an object to perform distance measurement.

In this event, one of the iToF sensor 111 and the dToF sensor 114 that has received the light emission request supplies the light emission request to the other, and the other of the iToF sensor 111 and the dToF sensor 114 that has received the light emission request causes the light emitting units 113 and 116 to emit light, receives reflected light, performs distance measurement and returns a data output to the control device 101.

Through any of such processing, the iToF sensor 111 and the dToF sensor 114 obtain the distance to the object in a time division manner.

However, it is necessary to appropriately control operation of the iToF sensor 111 and the dToF sensor 114 so as not to overlap with each other, which makes a device configuration and control for appropriately controlling the operation complicated.

Figure 5:
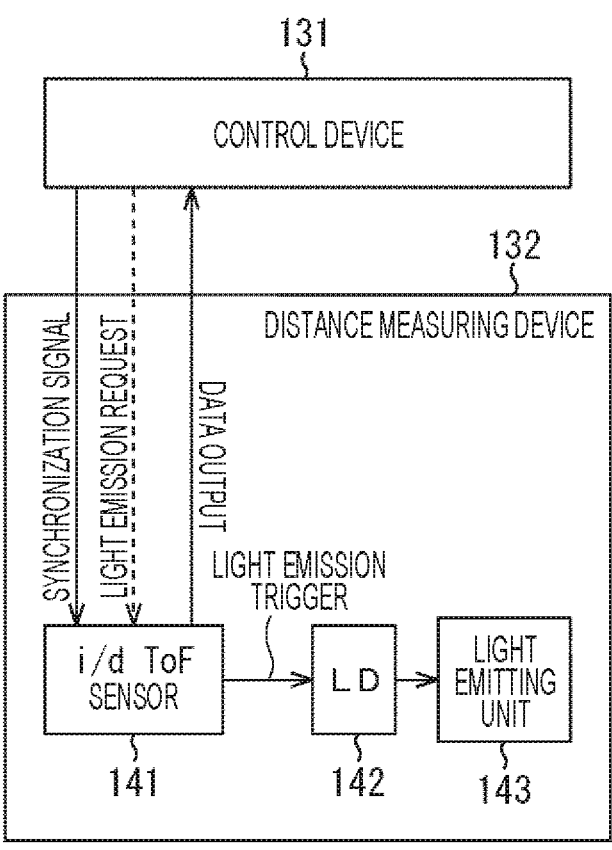
FIG. 5 is a view for explaining outline of a distance measuring device of the present disclosure.

Thus, in the present disclosure, as illustrated in FIG. 5, a distance measuring device 132 including an i/d ToF sensor 141 including both the iToF sensor and the dToF sensor, an LD 142, and a light emitting unit 143 is controlled by a control device 131.

The i/d ToF sensor 141 includes the iToF sensor and the dToF sensor, and thus, if the i/d ToF sensor 141 receives a synchronization signal from the control device 131, the i/d ToF sensor 141 operates by switching operation timings of the iToF sensor and the dToF sensor by itself, supplies a light emission trigger to the LD 142 on the basis of the light emission request and causes the light emitting unit 143 to emit distance measurement light.

As a result, the control device 101 only needs to acquire a distance measurement instruction and a data output, and thus, it is not necessary to control the iToF sensor and the dToF sensor while distinguishing between the iToF sensor and the dToF sensor, so that it is possible to reduce processing load related to the control and improve processing speed.

In addition, it is not necessary to control the iToF sensor and the dToF sensor while distinguishing between the iToF sensor and the dToF sensor, and thus, it is not necessary to provide a wiring, or the like, for controlling the iToF sensor and the dToF sensor while distinguishing between the iToF sensor and the dToF sensor, so that it is possible to further simplify the device configuration and reduce cost.

2. First Embodiment

Next, a configuration example of a first embodiment of the distance measuring device of the present disclosure will be described with reference to FIG. 6.

Figure 6:
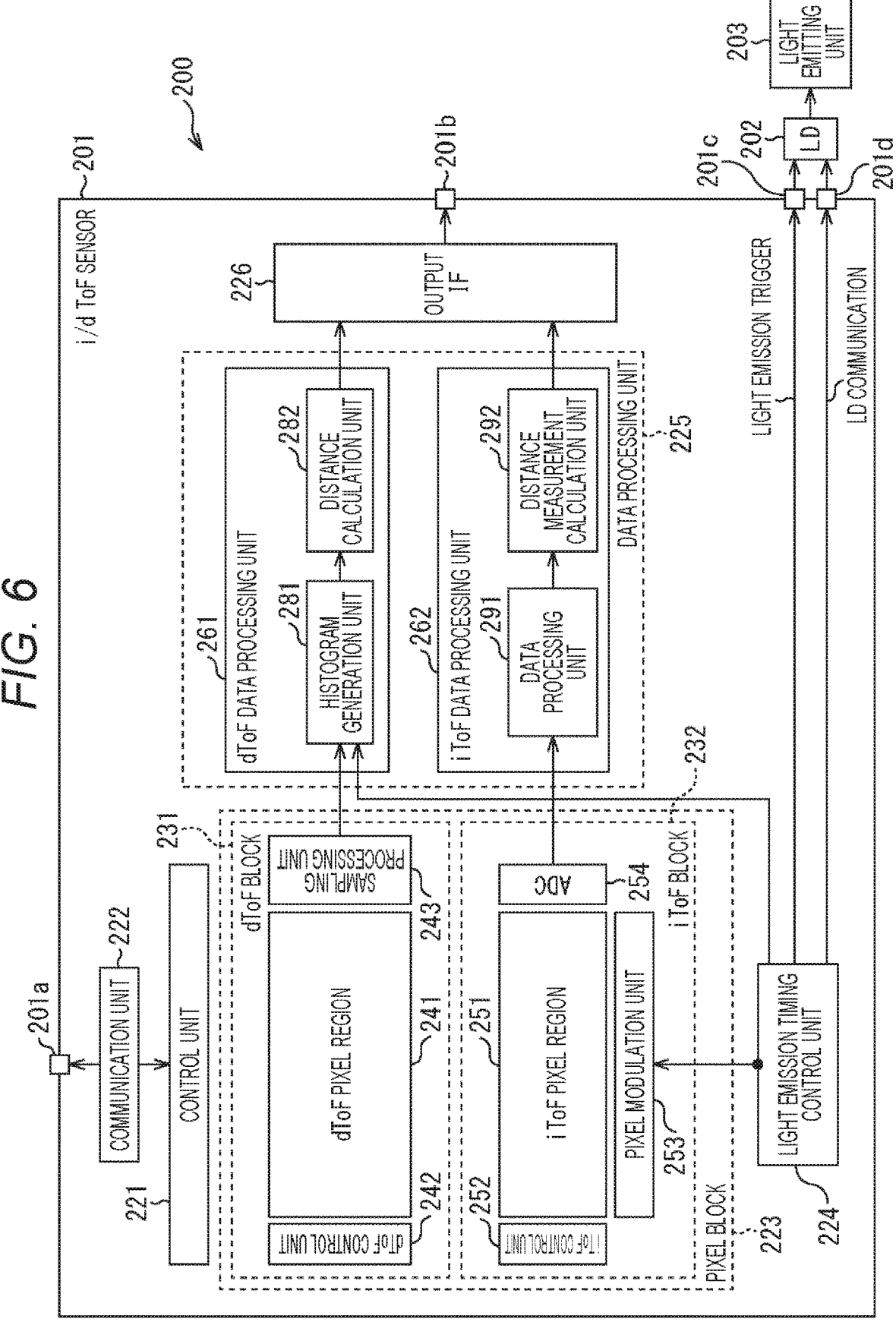
FIG. 6 is a view for explaining a configuration example of a first embodiment of the distance measuring device of the present disclosure.

A distance measuring device 200 in FIG. 6 includes an i/d ToF sensor 201, an LD 202, and a light emitting unit 203.

Note that the distance measuring device 200 in FIG. 6 has a configuration corresponding to the configuration of the distance measuring device 132 in FIG. 5, and the i/d ToF sensor 201, the LD 202, and the light emitting unit 203 in FIG. 6 have configurations corresponding to the configurations of the i/d ToF sensor 141, the LD 142, and the light emitting unit 143 in FIG. 5.

The i/d ToF sensor 201 includes a control unit 221, a communication unit 222, a pixel block 223, a light emission timing control unit 224, a data processing unit 225, and an output interface (IF) 226.

The control unit 221 controls the entire operation of the i/d ToF sensor 201.

More specifically, the control unit 221 controls the communication unit 222 to control the light emission timing control unit 224 on the basis of a light emission request or a synchronization signal from an external control device corresponding to the control device 131 in FIG. 5, generates a light emission trigger and supplies the light emission trigger to the LD 202.

The LD 202 controls the light emitting unit 203 on the basis of the light emission trigger from the i/d ToF sensor 201 to emit distance measurement light.

Furthermore, the control unit 221 controls the pixel block 223 to receive reflected light obtained by the distance measurement light emitted from the light emitting unit 203 being reflected by the object and output a signal corresponding to an amount of light to the data processing unit 225.

Furthermore, the control unit 221 controls the data processing unit 225 to execute data processing on the basis of the signal corresponding to an amount of light supplied from the pixel block 223 and generated by reception of the reflected light from the object, calculate a distance to the object, and output the distance to the external control device corresponding to the control device 131 in FIG. 5 via the output IF 226.

The pixel block 223 includes a dToF block 231 that functions as a dToF sensor and an iToF block 232 that functions as an iToF sensor. In other words, the pixel block 223 has a configuration having both a function as the dToF sensor and a function as the iToF sensor.

The dToF block 231 includes a dToF pixel region 241, a dToF control unit 242, and a sampling processing unit 243.

The dToF pixel region 241 has a configuration in which pixels including SPADs are arranged in an array, is controlled by the dToF control unit 242, receives reflected light generated by reflection of the distance measurement light by an object, and outputs a pixel signal corresponding to an amount of the received light.

The sampling processing unit 243 performs sampling processing on the pixel signal output from the dToF pixel region 241 and outputs the pixel signal to the data processing unit 225.

The iToF block 232 includes an iToF pixel region 251, an iToF control unit 252, a pixel modulation unit 253, and an ADC 254.

The iToF pixel region 251 has a configuration in which pixels including a current assisted photonic demodulator (CAPD) are arranged in an array, is controlled by the iToF control unit 252, receives reflected light generated by the distance measurement light being reflected by an object and accumulates and outputs a pixel signal corresponding to an amount of the received light.

The pixel modulation unit 253 modulates the pixel signal output from the iToF pixel region 251 and outputs the modulated pixel signal to the ADC 254.

The analog digital converter (ADC) 254 converts the pixel signal modulated by the pixel modulation unit 253 from an analog signal to a digital signal and outputs the digital signal to the data processing unit 225.

The data processing unit 225 includes a dToF data processing unit 261 and an iToF data processing unit 262.

The dToF data processing unit 261 implements distance measurement calculation on the basis of a sampling result of the pixel signal supplied from the dToF block 231 of the pixel block 223.

More specifically, the dToF data processing unit 261 includes a histogram generation unit 281 and a distance calculation unit 282.

The histogram generation unit 281 generates a histogram from the sampling result supplied from the iToF block 232 of the pixel block 223 and outputs the histogram to the distance calculation unit 282.

The distance calculation unit 282 calculates a distance on the basis of the histogram supplied from the histogram generation unit 281 and outputs the distance to the output IF 226.

Figure 7:
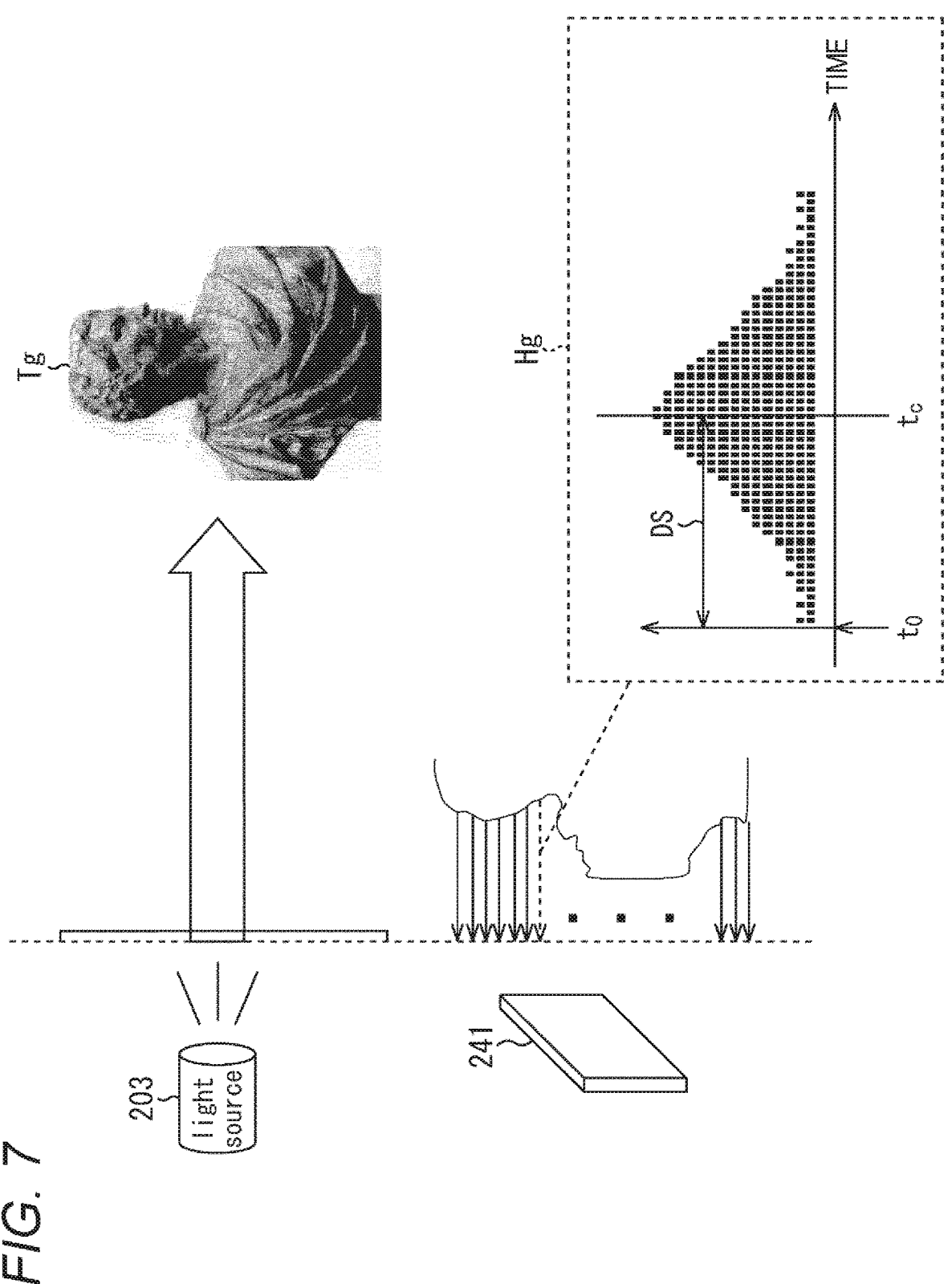
FIG. 7 is a view for explaining a distance measuring method using a dTOF sensor.

In other words, as illustrated in an upper part of FIG. 7, if distance measurement light indicated by a rightward arrow in the figure and emitted from the light emitting unit 203 is reflected by an object Tg, reflected light indicated by a leftward arrow in the figure is generated, photons constituting the reflected light are received by pixels including SPADs constituting the dToF pixel region 241, and a pixel signal corresponding to a light amount is sampled and supplied to the dToF data processing unit 261.

Then, the histogram generation unit 281 of the dToF data processing unit 261 generates a histogram Hg as illustrated in a lower part of FIG. 7 on the basis of the sampled pixel signal.

More specifically, the histogram generation unit 281 adds a plurality of pixel signals for removing influence of external light and a dark current and generates the histogram Hg from an integration result obtained by repeating light emission and light reception a plurality of times.

On the basis of the histogram Hg, the distance calculation unit 282 calculates a distance corresponding to a detection result of the dToF block 231 in the pixel block 223 on the basis of a period Ds that is a difference between time t0 that is a light emission timing and peak time tp.

The iToF data processing unit 262 implements distance measurement processing on the basis of the pixel signal supplied from the iToF block 232 of the pixel block 223.

More specifically, the iToF data processing unit 262 includes a data processing unit 291 and a distance measurement calculation unit 292.

The data processing unit 291 performs various kinds of processing such as binning processing, filtering processing, and error determination processing on the data based on the pixel signal supplied from the iToF block 232 of the pixel block 223 and outputs the data to the distance measurement calculation unit 292.

The distance measurement calculation unit 292 calculates a distance by processing the data subjected to various kinds of processing and supplied from the data processing unit 291, and outputs the distance to the output IF 226.

Figure 8:
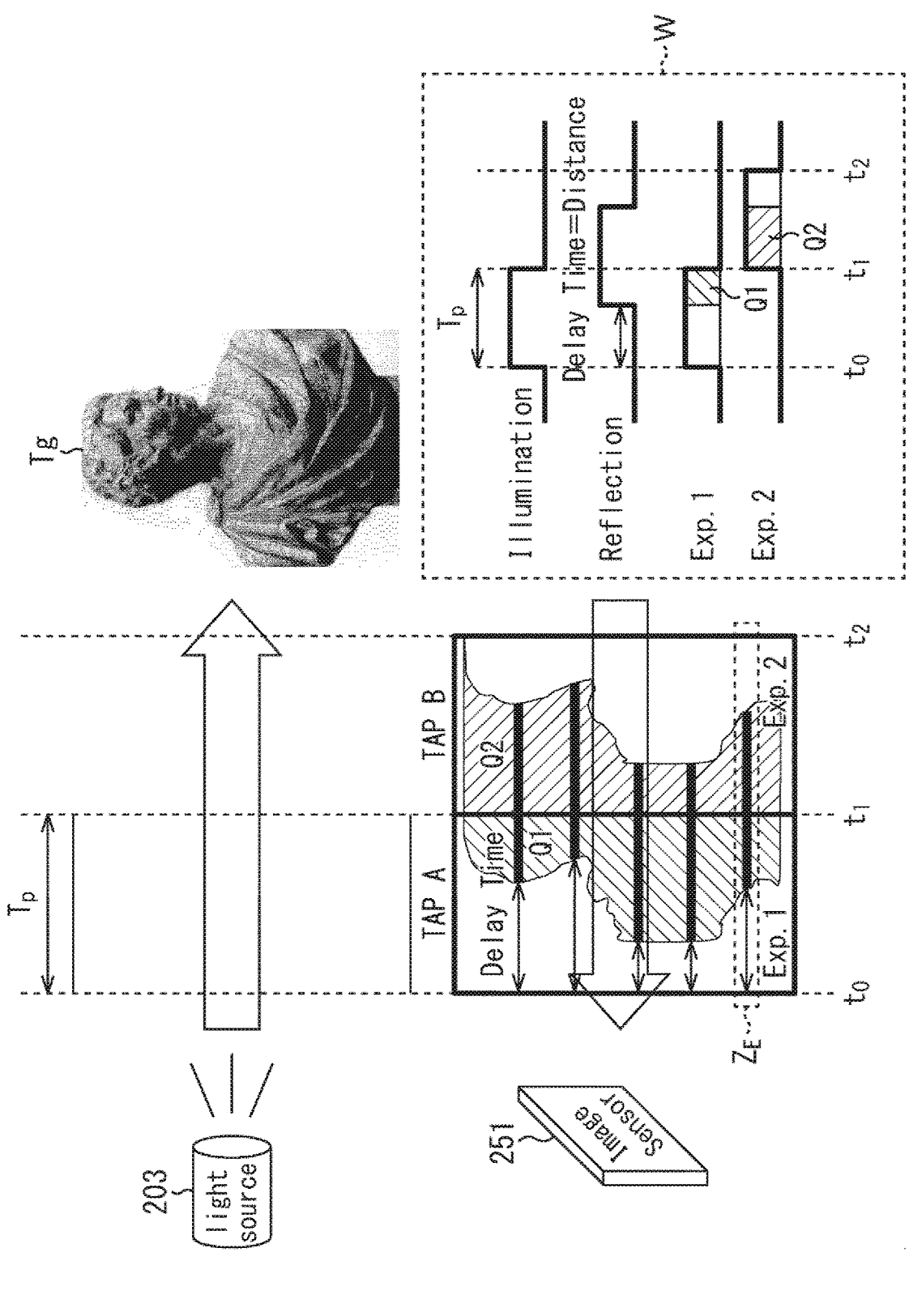
FIG. 8 is a view for explaining a distance measuring method using an iTOF sensor.

In other words, as illustrated in an upper part of FIG. 8, each pixel constituting the iToF pixel region 251 accumulates reflected light indicated by a leftward arrow generated by the distance measurement light indicated by a rightward arrow being reflected by an object Tg, which is generated by light emission and extinction repeated at a high frequency by the light emitting unit 203, as a pixel signal obtained at a first timing different by a predetermined phase difference and as a pixel signal obtained at a second timing.

Here, for the same pixel, the pixel signal obtained at the first timing will be referred to as TAPA, and the pixel signal obtained at the second timing will be referred to as TAPB.

Furthermore, in a lower left part of FIG. 8, the accumulation result of the pixel signal TAPA at the first timing is a pixel value Q1 indicated by a portion with oblique lines from the upper right to the lower left, and the accumulation result of the pixel signal at the second timing different from the first timing by a predetermined phase difference is a pixel value Q2 indicated by a portion with oblique lines from the upper left to the lower right.

In this event, in a case where the light emission timing of the light emitting unit 203 in a lower right dotted frame W in FIG. 8 is indicated by waveform Illumination and the light emitting unit 203 emits light for a period Tp from the time t0, the reflected light is received after being reflected by the object Tp, and thus, for example, waveform reflection indicating a light reception timing is received as a waveform delayed by a period corresponding to a period during which the distance measurement light reciprocates a distance from the light emitting unit 203 to the object Tp.

Furthermore, if the pixel signal TAPA receives the reflected light at a timing indicated by a waveform Exp. 1 and the pixel signal TAPB receives the reflected light at a timing indicated by a waveform Exp. 2, for example, for a predetermined pixel corresponding to a range ZE enclosed by a dotted line in a lower left part of FIG. 8, the pixel value Q1 of the pixel signal TAPA corresponds to a portion with oblique lines from the upper right to the lower left of the entire area of the rectangular waveform Exp. 1, and the pixel value Q2 of the pixel signal TAPB corresponds to a portion with oblique lines from the upper left to the lower right of the entire area of the rectangular waveform Exp. 2.

Thus, after the data processing unit 291 performs various kinds of processing such as binning processing, filter processing, and error determination processing on the pixel values Q1 and Q2, the distance measurement calculation unit 292 obtains a delay time (Delay Time) at a reception timing of the reflected light by using a ratio of the pixel values Q1 and Q2, and calculates a distance (Distance) to the object Tg corresponding to the detection result of the iToF block 232 in the pixel block 223 on the basis of the delay time (Delay Time).

In addition, distance measurement (hereinafter, also referred to as dToF distance measurement) based on the dToF block 231 and the dToF data processing unit 261 and distance measurement (hereinafter, also referred to as iToF distance measurement) based on the iToF block 232 and the iToF data processing unit 262 are different from each other in a light emission timing of the distance measurement light of the light emitting unit 203 as described above, and thus, the dToF distance measurement and the iToF distance measurement cannot be performed at the same time and need to be performed at different timings.

Thus, the control unit 221 controls the light emission timing control unit 224 to adjust the light emission setting so that the light emitting unit 203 emits the distance measurement light corresponding to each processing according to the timing at which the dToF distance measurement is performed and the timing at which the iToF distance measurement is performed.

First Example of Pixel Constituting dToF Pixel Region

Next, a first example of a pixel constituting the dToF pixel region 241 will be described with reference to FIG. 9.

Figure 9:
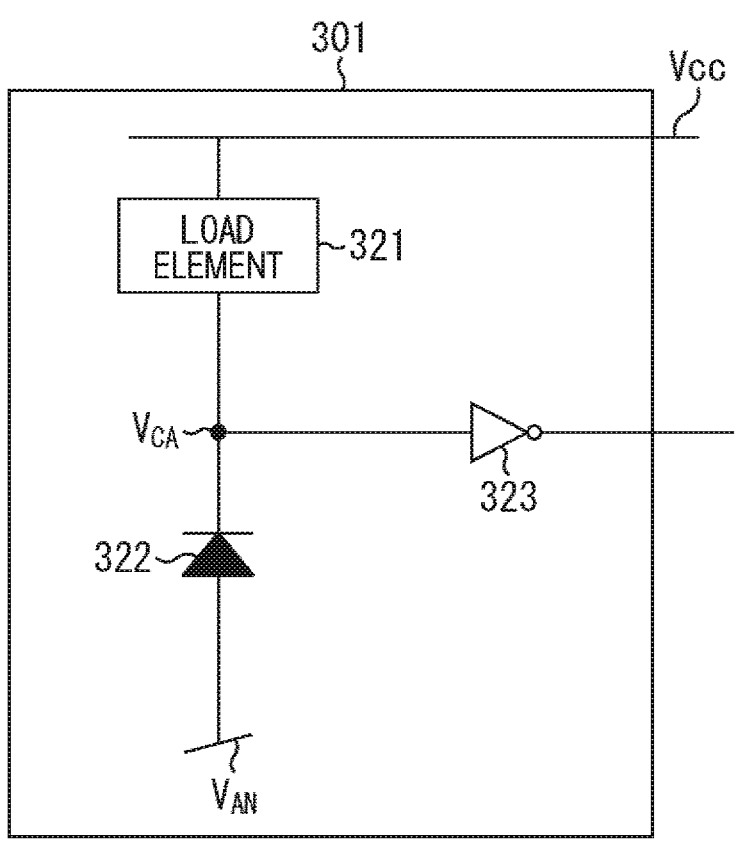
FIG. 9 is a view illustrating a first configuration example of a pixel in a dTOF pixel region.

A pixel 301 constituting the dToF pixel region 241 in FIG. 9 includes a load element (LOAD element) 321, a photoelectric conversion element 322 including a SPAD, and an inverter 323.

More specifically, one terminal of the load element 321 is connected to a power supply potential Vcc, and the other terminal is connected to a cathode of the photoelectric conversion element 322 and an input terminal of the inverter 323.

The photoelectric conversion element 322 has a cathode to which the other terminal of the load element 321 and the input terminal of the inverter 323 are connected, and an anode to which a predetermined power supply potential $V_{AN}$ is externally applied.

The inverter 323 has an input terminal to which the other terminal of the load element 321 and the cathode of the photoelectric conversion element 322 are connected.

The pixel 301 in FIG. 9 has a configuration called a passive recovery (passive recharge) circuit and passively recovers a voltage drop caused by quenching.

Second Example of Pixel Constituting dToF Pixel Region

Next, a second example of the pixel constituting the dToF pixel region 241 will be described with reference to FIG. 10.

Figure 10:
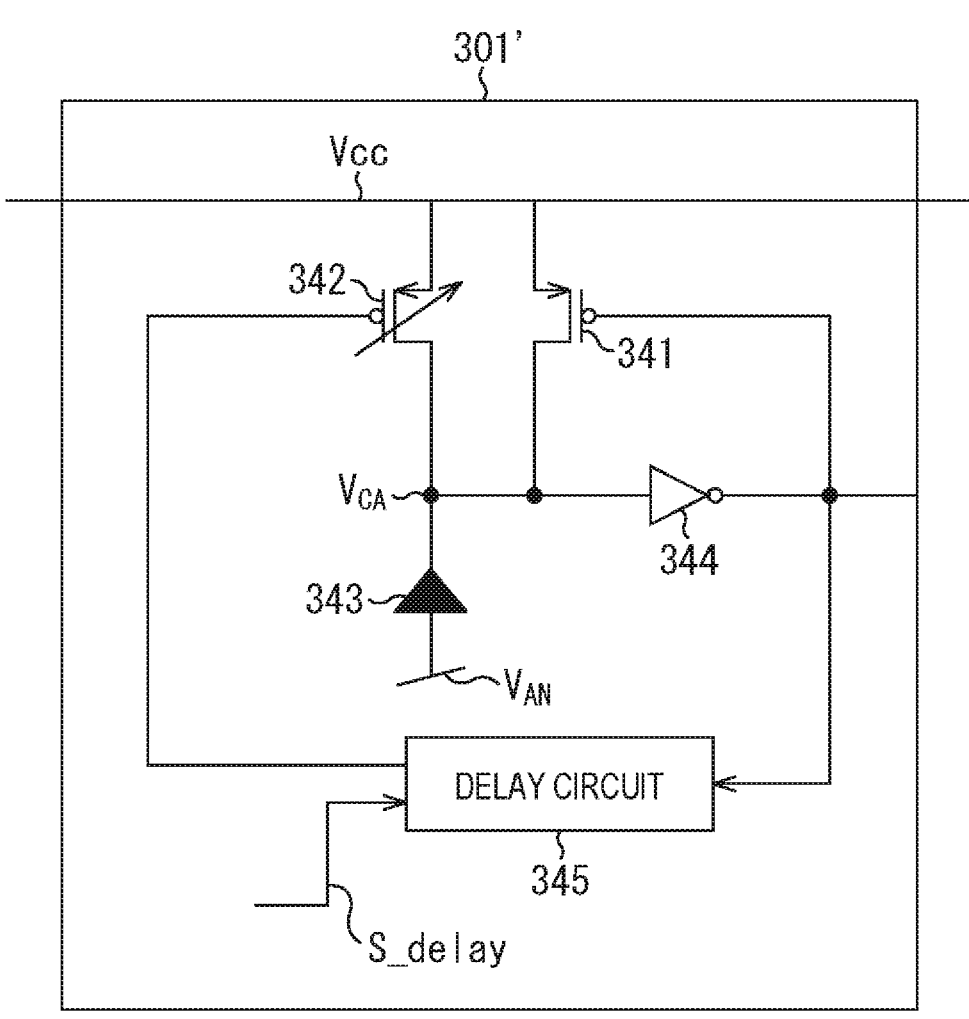
FIG. 10 is a view illustrating a second configuration example of the pixel in the dTOF pixel region.

A pixel 301' constituting the dToF pixel region 241 in FIG. 10 includes MOSFETs 341 and 342, a photoelectric conversion element 343 including a SPAD, an inverter 344, and a delay circuit 345.

More specifically, the MOSFET 341 has a source connected to a power supply potential Vcc, a gate connected to an input terminal of the inverter 344 and an input terminal of the delay circuit 345, and a drain connected to a cathode of the photoelectric conversion element 343, a drain of the MOSFET 342, and the input terminal of the inverter 344.

The MOSFET 342 has a source connected to the power supply potential Vcc, a gate connected to an output terminal of the delay circuit 345, and a drain connected to the cathode of the photoelectric conversion element 343, a drain of the MOSFET 341, and the input terminal of the inverter 344.

The photoelectric conversion element 343 has a cathode to which a drain of each of the MOSFETs 341 and 342 and an input terminal of the inverter 323 are connected, and an anode to which a predetermined power supply potential $V_{AN}$ is externally applied.

The inverter 344 has an input terminal to which a source of each of the MOSFETs 341 and 342 and the cathode of the photoelectric conversion element 322 are connected.

The delay circuit 345 has an input terminal to which a gate of the MOSFET 341 and an output terminal of the inverter are connected, and an output terminal to which a gate of the MOSFET 342 is connected.

The pixel 301' in FIG. 10 has a configuration called an active recovery (active recharge) circuit, and the delay circuit 345 outputs a delay signal to the gate of the MOSFET 342 on the basis of an output of the inverter 344 and an adjustment signal S_Delay to actively recover a voltage drop caused by quenching.

Third Example of Pixel Constituting dToF Pixel Region

Next, a third example of the pixel constituting the dToF pixel region 241 will be described with reference to FIG. 11.

Figure 11:
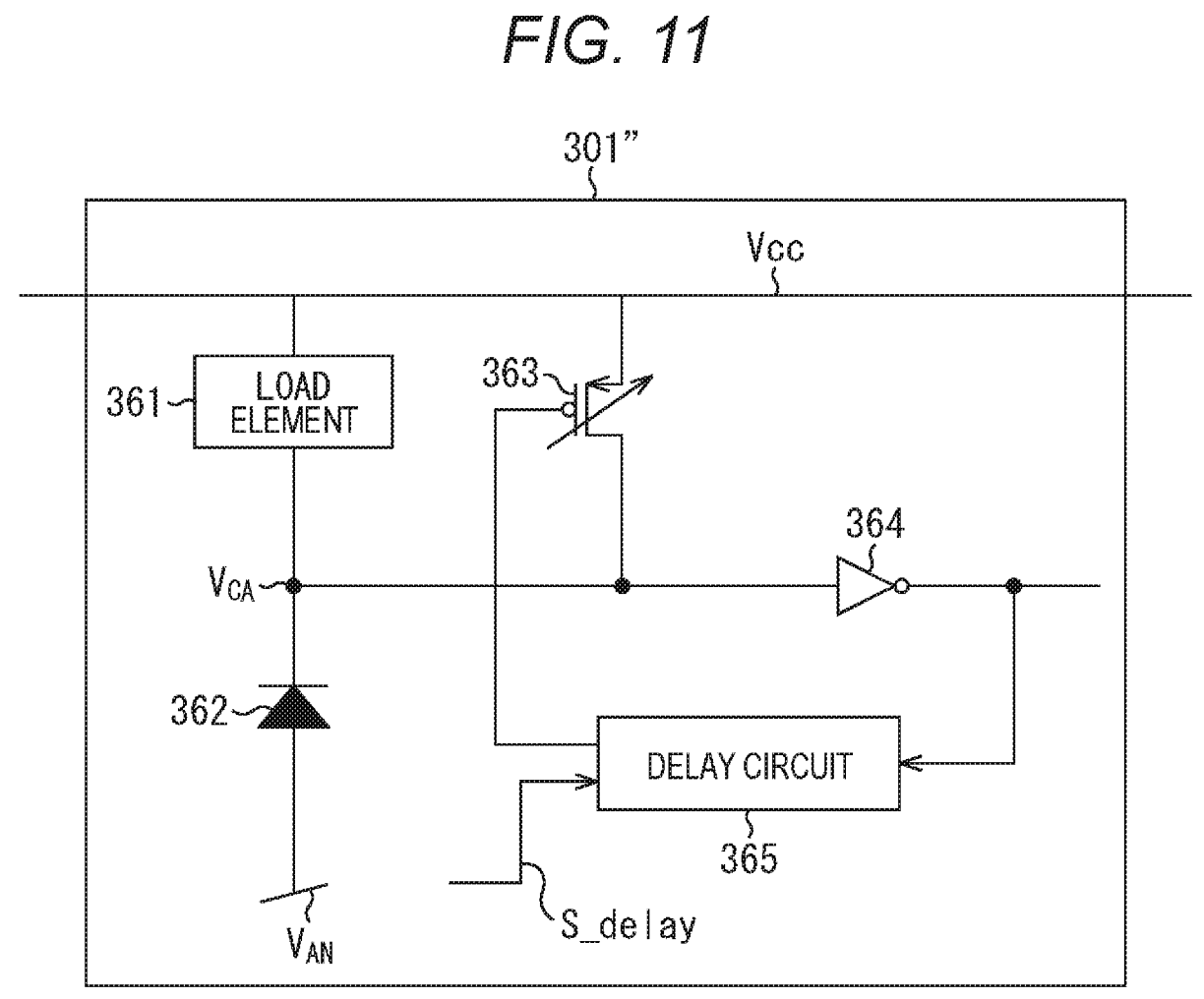

A pixel 301" constituting the dToF pixel region 241 in FIG. 11 includes a load element (LOAD element) 361, a photoelectric conversion element 362 including a SPAD, a MOSFET 363, an inverter 364, and a delay circuit 365.

More specifically, the load element 361 has one terminal connected to the power supply potential Vcc, and the other terminal connected to the cathode of the photoelectric conversion element 322, a drain of the MOSFET 363, and an input terminal of the inverter 364.

The photoelectric conversion element 362 has a cathode to which the other terminal of the load element 361 is connected and which is connected to the drain of the MOSFET 363 and the input terminal of the inverter 323, and an anode to which a predetermined power supply potential $V_{AN}$ is externally applied.

The MOSFET 363 has a source connected to the power supply potential Vcc, a gate connected to the output terminal of the delay circuit 365, and a drain connected to the other terminal of the load element 361, the cathode of the photoelectric conversion element 362, and the input terminal of the inverter 364.

The inverter 364 has an input terminal connected to the other terminal of the load element 361, the cathode of the photoelectric conversion element 322, and the drain of the MOSFET 363, and an output terminal connected to an input terminal of the delay circuit 365.

The delay circuit 365 has an input terminal connected to an output terminal of the inverter 364, and an output terminal connected to a gate of the MOSFET 363.

The pixel 301" in FIG. 11 has a configuration called an active recovery (active recharge) circuit, and the delay circuit 365 outputs a delay signal to the gate of the MOSFET 363 on the basis of an output of the inverter 364 and the adjustment signal S_Delay to actively recover a voltage drop caused by quenching.

Fourth Example of Pixel Constituting dToF Pixel Region

In the above description, a pixel including a passive recovery (passive recharge) circuit and a pixel including an active recovery (active recharge) circuit have been described, but both may be combined and used while being switched.

Figure 12:
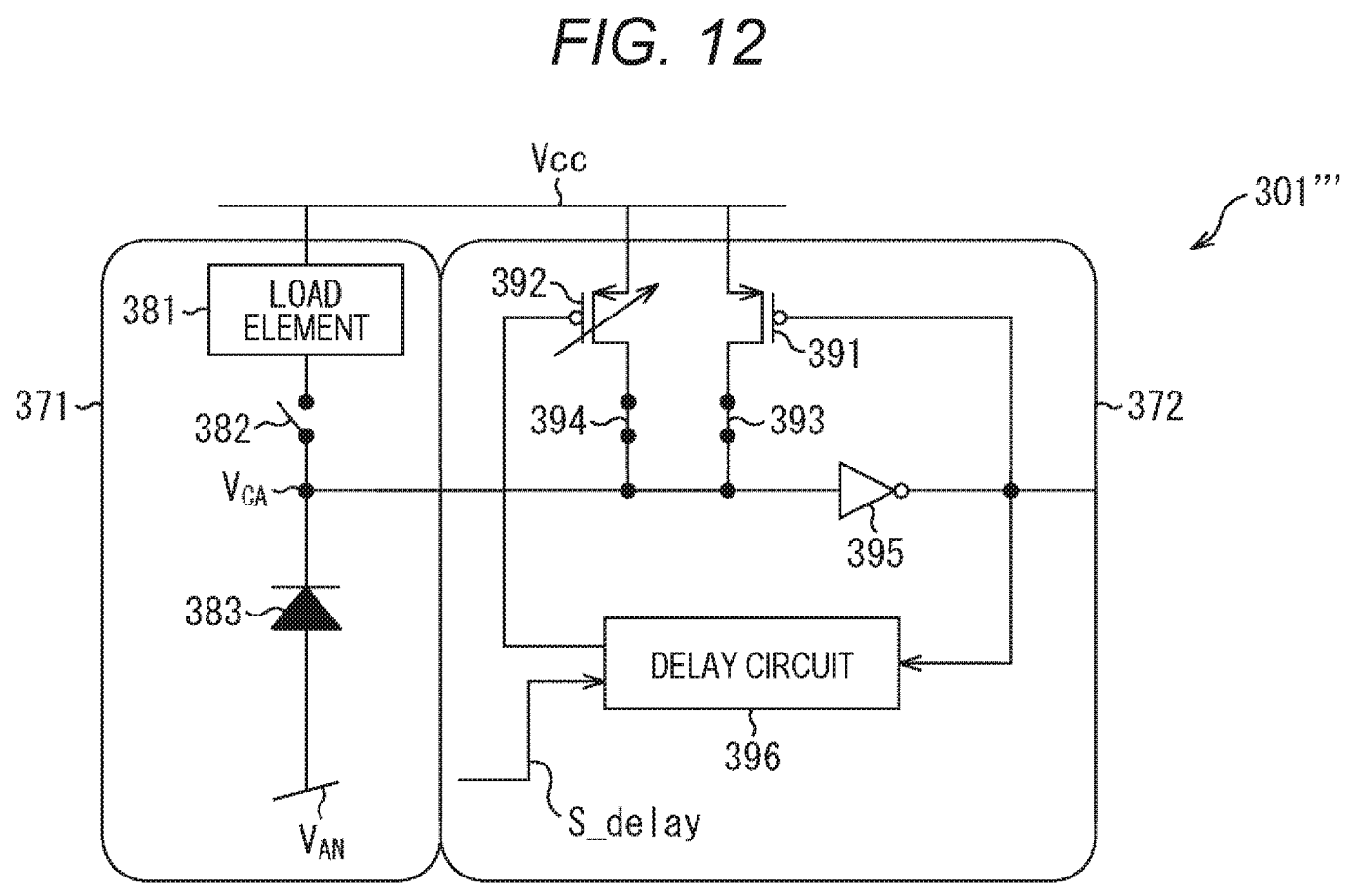

In other words, FIG. 12 illustrates an example of the pixel constituting the dToF pixel region 241 in which a pixel including a passive recovery circuit and a pixel including an active recovery circuit are combined and used while being switched.

A pixel 301''' constituting the dToF pixel region 241 in FIG. 12 includes a passive component part 371 and an active component part 372.

The passive component part 371 includes a photoelectric conversion element 383 including a load element (LOAD element) 381, a switch 382, and a SPAD.

In addition, the active component part 372 includes MOSFETs 391 and 392, switches 393 and 394, an inverter 395, and a delay circuit 396.

Here, the load element 381 and the photoelectric conversion element 383 of the passive component part 371, and the inverter 395 of the active component part 372 have configurations corresponding to the configurations of the load element 321, the photoelectric conversion element 322, and the inverter 323 in FIG. 9.

In addition, the MOSFETs 391 and 392, the inverter 395, and the delay circuit 396 of the active component part 372 have configurations corresponding to the configurations of the MOSFETs 341 and 342, the inverter 344, and the delay circuit 345 in FIG. 10.

Then, by exclusively switching on and off of the switch 382 and the switches 391 and 392, whether the passive component part 371 is caused to function or the active component part 372 is caused to function is switched.

FIG. 12 illustrates a state in which the active component part 372 functions as a result of the switch 382 being turned off and the switches 391 and 392 being turned on. Of course, contrary to the state in FIG. 12, the state can be switched to a state in which the passive component part 371 functions as a result of the switch 382 being turned on and the switches 391 and 392 being turned off.

First Example of Pixel Constituting iToF Pixel Region

Next, a first example of a pixel constituting the iToF pixel region will be described with reference to FIG. 13. Note that the pixel constituting the iToF pixel region is divided into two regions and is controlled to operate in a state where a phase difference at predetermined time intervals occurs. Here, a configuration corresponding to each of the two regions is distinguished by adding "A" and "B" to the reference numerals.

Figure 13:
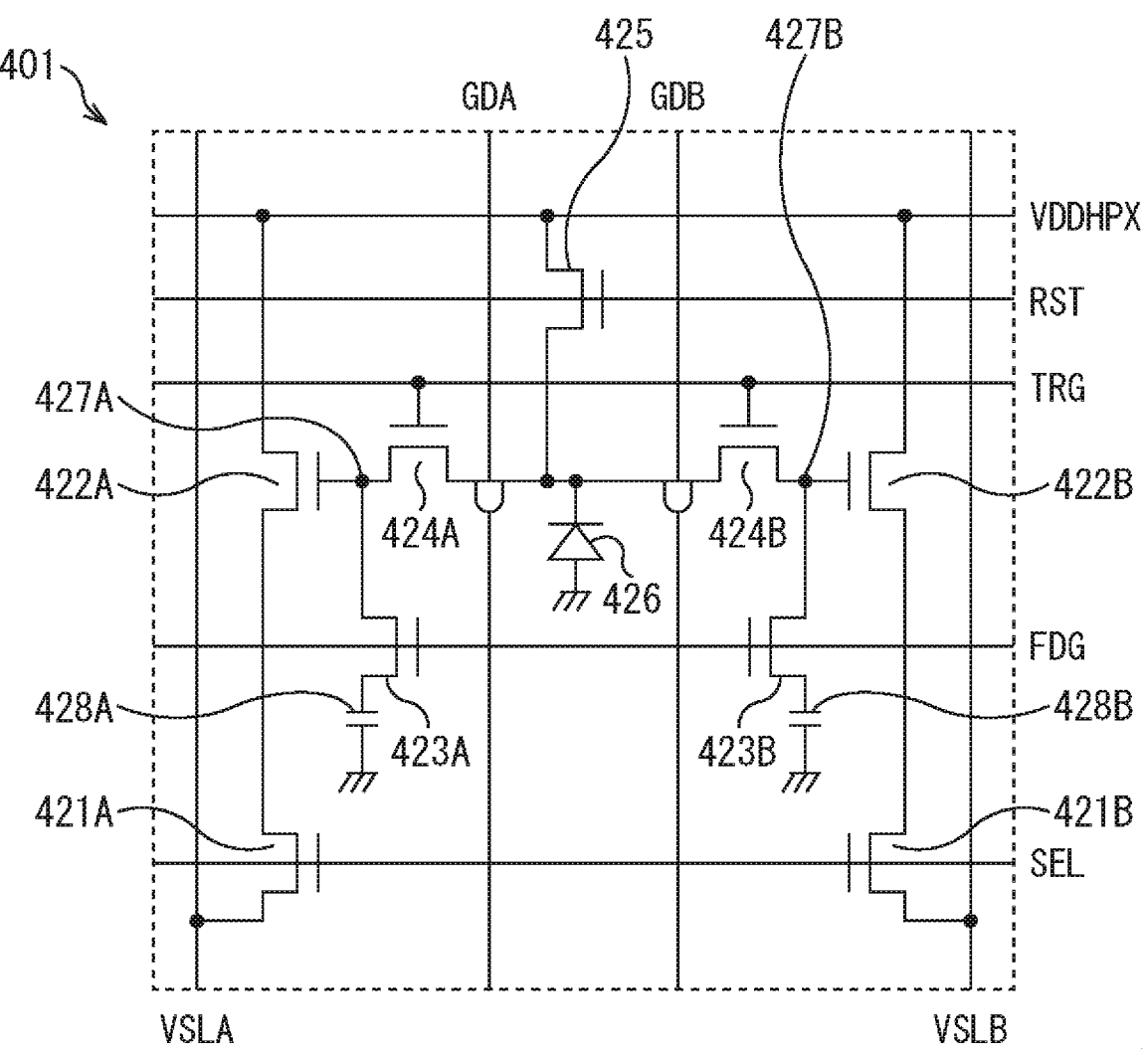
FIG. 13 is a view illustrating a first configuration example of a pixel in an iTOF pixel region.

A pixel 401 in FIG. 13 includes selection transistors 421A and 421B, amplification transistors 422A and 422B, FD gate transistors 423A and 423B, transfer transistors 424A and 424B, a reset transistor 425, a photoelectric conversion element (PD) 426, additional capacitors 427A and 427B, and floating diffusion regions (FDs) 428A and 428B.

The transfer transistors 424A and 424B become conductive if a transfer drive signal TRG supplied to the gates of the transfer transistors 424A and 424B becomes active and transfer charges accumulated in the PD 426 to the FDs 427A and 427B.

Note that while FIG. 13 illustrates a configuration where one transfer drive signal TRG is provided to share the transfer transistors 424A and 424B, in reality, the transfer drive signals TRG are individually provided, and on and off are controlled such that each of the transfer transistors 414A and 424B exclusively operates.

The FDs 428A and 428B are charge storage units that temporarily store and hold charges transferred from the PD 426.

The FD gate transistors 423A and 423B become conductive if an FD drive signal FDG supplied to the gates becomes active and are connected to the FDs 448A and 448B and additional capacitors 429A and 429B.

Note that while FIG. 13 illustrates a configuration where one FD drive signal FDG is provided to share the FD gate transistors 423A and 423B, in reality, the FD drive signals FDG are individually provided, and on and off are controlled such that each of the FD gate transistors 423A and 423B exclusively operates.

If a reset drive signal RST supplied to the gate of the reset transistor 425 becomes active, the reset transistor 425 becomes conductive and resets a potential of the PD 426.

The amplification transistors 422A and 422B have source electrodes connected to vertical transfer lines VSLA and VSLB via the transistors 421A and 421B, thereby being connected to a constant current source (not illustrated) to form a source follower circuit.

The selection transistors 421A and 421B are connected between the amplification transistors 422A and 422B and the vertical transfer lines VSLA and VSLB, and become conductive if a selection signal SEL supplied to the gate becomes active and output signals output from the amplification transistors 422A and 422B to the vertical transfer lines VSLA and VSLB.

Note that while FIG. 13 illustrates a configuration where a single selection signal SEL is provided to share the selection transistors 421A and 421B, in reality, the selection signals SEL are individually provided, and on and off are controlled such that each of the selection transistors 421A and 421B exclusively operates.

Next, operation of the pixel 401 in FIG. 13 will be described.

Charges of all the pixels 401 are reset before light is received.

In other words, the FD gate transistors 423A and 423B, the transfer transistors 424A and 424B, and the reset transistor 425 are turned on, and the accumulated charges of the PDs 447, the FDs 448A and 448B are discharged.

After the accumulated charges are discharged, light reception is started in all the pixels 401.

In other words, the transfer transistors 424A and 424B are alternately driven. As a result, the charges accumulated by the PD 426 are alternately distributed and accumulated in the FDs 428A and 428B.

The reflected light received by the pixel 401 is received after being delayed from a timing at which the light source emits the distance measurement light in accordance with a distance to the object.

In this event, as described with reference to FIG. 8, the distribution of the charges to be accumulated in the FDs 428A and 428B changes depending on a delay time in accordance with the distance to the object, so that the distance to the object can be obtained from a distribution ratio of the charges to be accumulated in the FDs 428A and 428B.

Second Example of Pixel Constituting iToF Pixel Region

Next, a second example of the pixel constituting the iToF pixel region will be described with reference to FIG. 14.

Figure 14:
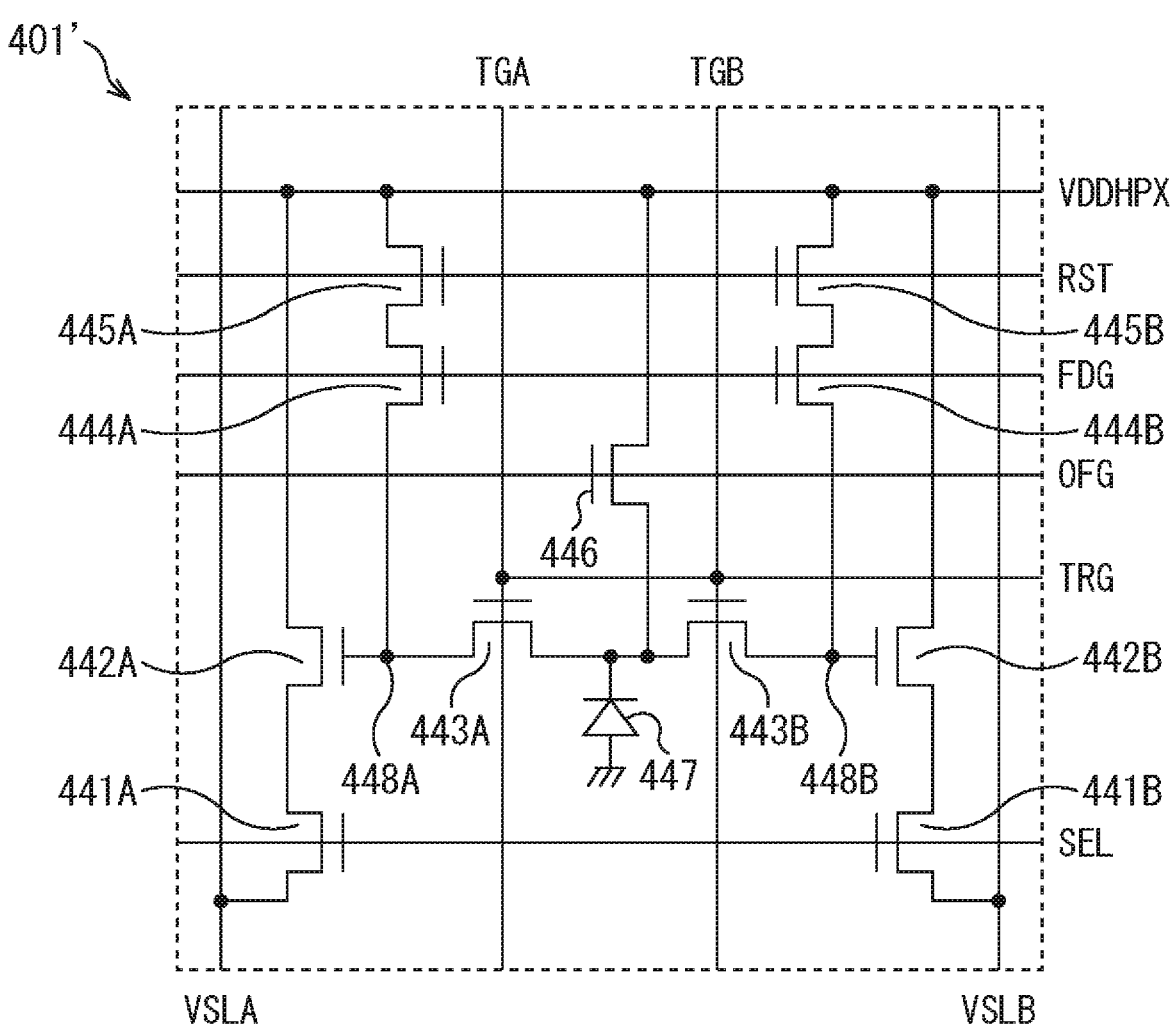
FIG. 14 is a view illustrating a second configuration example of the pixel in the iTOF pixel region.

A pixel 401' in FIG. 14 includes selection transistors 441A and 441B, amplification transistors 442A and 442B, transfer transistors 443A and 443B, FD gate transistors 444A and 444B, reset transistors 445A and 445B, an overflow gate transistor 446, a photoelectric conversion element (PD) 447, and floating diffusion regions (FDs) 448A and 448B.

The transfer transistors 443A and 443B become conductive if a transfer drive signal TRG supplied to gates of the transfer transistors 443A and 443B becomes active and transfer charges accumulated in the PD 447 to the FDs 448A and 448B.

Note that while FIG. 14 illustrates a configuration where a single transfer drive signal TRG is provided to share the transfer transistors 443A and 443B, in reality, the transfer drive signals TRG are individually provided, and on and off are controlled such that each of the transfer transistors 443A and 443B exclusively operates.

The FDs 448A and 448B are charge storage units that temporarily store and hold the charges transferred from the PD 447.

The FD gate transistors 444A and 444B become conductive if a FD drive signal FDG supplied to gates of the FD gate transistors 444A and 444B becomes active and are connected to the FDs 448A and 448B and the reset transistors 445A and 445B.

Note that while FIG. 14 illustrates a configuration where a single FD drive signal FDG is provided to share the FD gate transistors 444A and 444B, in reality, the FD drive signals FDG are individually provided, and on and off are controlled such that each of the FD gate transistors 444A and 444B exclusively operates.

The reset transistors 445A and 445B become conductive if a reset drive signal RST supplied to gates of the reset transistors 445A and 445B becomes active, are connected to the FD gate transistors 444A and 444B and reset potentials of the FDs 448A and 448B if the FD gate transistors 444A and 444B are conductive.

Note that while FIG. 14 illustrates a configuration where a single reset drive signal RST is provided to share the reset transistors 445A and 445B, in reality, the reset drive signals RST are individually provided, and on and off are controlled such that each of the reset transistors 445A and 445B exclusively operates.

The overflow gate transistor 446 becomes conductive if a discharge drive signal OFG supplied to a gate becomes active and discharges charges accumulated in the PD 447.

The amplification transistors 442A and 442B have source electrodes connected to the vertical transfer lines VSLA and VSLB via the transistors 441A and 441B, thereby being connected to a constant current source (not illustrated) to form a source follower circuit.

The selection transistors 441A and 441B are connected between the amplification transistors 442A and 442B and the vertical transfer lines VSLA and VSLB, become conductive if a selection signal SEL supplied to gates becomes active and output signals output from the amplification transistors 442A and 442B to the vertical transfer lines VSLA and VSLB.

Note that while FIG. 14 illustrates a configuration where a single selection signal SEL is provided to share the selection transistors 441A and 441B, in reality, the selection signals SEL are individually provided, and on and off are controlled such that each of the selection transistors 441A and 441B exclusively operates.

Next, operation of the pixel 401' in FIG. 14 will be described.

Charges of all the pixels 401' are reset before light is received.

In other words, the FD gate transistors 444A and 444B, the overflow gate transistor 446, and the reset transistors 445A and 445B are turned on, and the accumulated charges of the PDs 447, the FDs 448A and 448B are discharged.

After the accumulated charges are discharged, light reception is started in all the pixels 401'.

In other words, the transfer transistors 443A and 443B are alternately driven. As a result, the charges accumulated by the PD 447 are alternately distributed and accumulated in the FDs 448A and 448B.

The reflected light received by the pixel 401' is received after being delayed from a timing at which the light source emits the distance measurement light in accordance with a distance to the object.

In this event, as described with reference to FIG. 8, the distribution of the charges to be accumulated in the FDs 448A and 448B changes depending on a delay time in accordance with the distance to the object, so that the distance to the object can be obtained from a distribution ratio of the charges to be accumulated in the FDs 448A and 448B.

Operation of i/d ToF Sensor in FIG. 6

Next, operation of the i/d ToF sensor 201 in FIG. 6 will be described.

(Operation in a case where iToF sensor and dToF sensor are independent)

First, in description of operation of the i/d ToF sensor 201 in FIG. 6, operation in a case where the iToF sensor and the dToF sensor are not integrated as in the i/d ToF sensor 201 in FIG. 6 but are independent as in the distance measuring device 11 in FIG. 2 will be described with reference to the timing chart in an upper part of FIG. 15.

Figure 15:
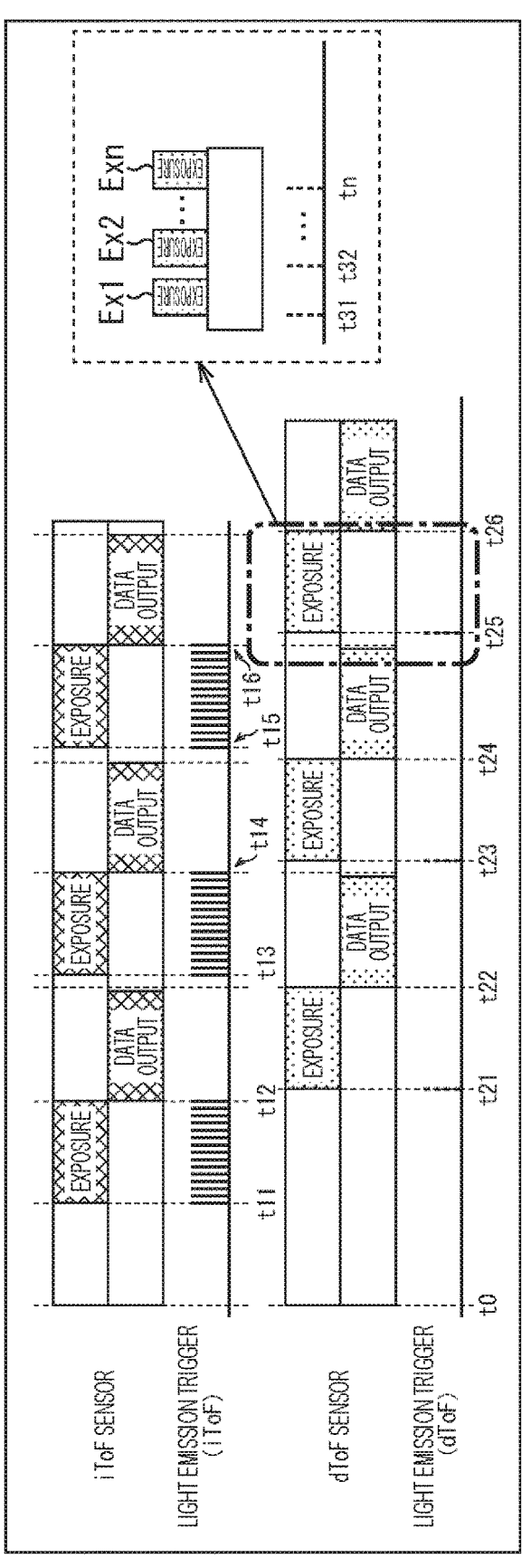
FIG. 15 is a timing chart for explaining operation of the distance measuring device in FIG. 6.
Figure 15:
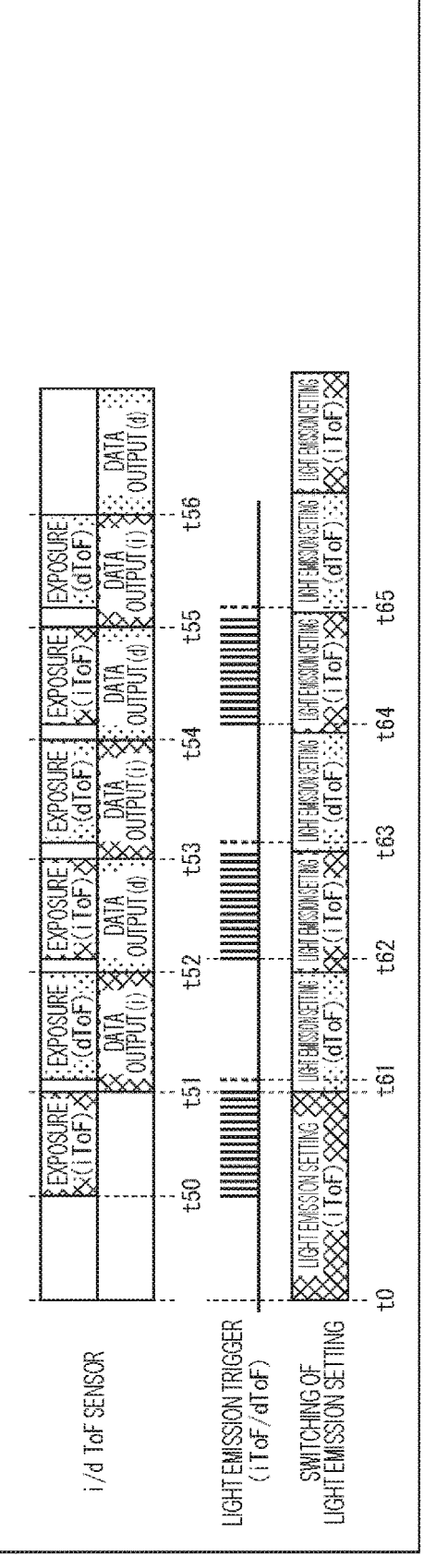

Note that, in the timing chart in the upper part of FIG. 15, an exposure timing and a data output timing of the iToF sensor, a timing of the light emission trigger (iToF) that causes the distance measurement light for the iToF sensor to be emitted, an exposure timing and a data output timing of the dToF sensor, and a timing of the light emission trigger (dToF) that causes the distance measurement light for the dToF sensor to be emitted are illustrated from the top, respectively.

In a case where the distance measurement light is emitted by the light emitting unit 203, and the iToF sensor and the dToF sensor perform distance measurement in the same range, interference occurs if distance measurement is performed at the same timing, so that the iToF sensor and the dToF sensor need to operate at different timings by time division processing.

In other words, as illustrated in the upper part of FIG. 15, in a case where the iToF sensor is operated first, by outputting a trigger (LD light emission trigger (iToF)) for causing the light emitting unit to emit light at a predetermined frequency from time t11 to t12 in order to cause the distance measurement light for the iToF sensor to be emitted, light emission and extinction are repeated at a predetermined frequency, and the distance measurement light is projected.

In response to this, from time t11 to t12, the iToF sensor performs exposure for receiving reflected light, and a pixel signal corresponding to an amount of received light is accumulated.

Then, if light emission of the light emitting unit with respect to the iToF sensor and exposure by the iToF sensor end at time t12, data processing based on the pixel signals accumulated in the iToF sensor is performed from time t12 to t13, and a distance measurement result is output.

On the other hand, emission of the distance measurement light for the iToF sensor has ended at time t12, and thus, in order to cause the distance measurement light for the dToF sensor to be emitted, a trigger (LD emission trigger (dToF)) for causing the light emitting unit to emit light is output, and the distance measurement light is projected at time t21, which is a timing immediately after (after time t12) the end of the emission of the distance measurement light for the iToF sensor.

In response to this, from time t21 to t22, the dToF sensor performs exposure for receiving the reflected light, and a pixel signal corresponding to an amount of the received light is accumulated.

Then, if the light emission of the light emitting unit with respect to the dToF sensor and the exposure by the dToF sensor end at time t22, data processing based on the pixel signals accumulated in the dToF sensor is performed, and a distance measurement result is output (data output) from time t22 to t14.

Furthermore, the emission of the distance measurement light for the dToF sensor has ended at time t22, and thus, immediately thereafter (after time t13), a trigger (LD emission trigger (iToF)) for causing the light emitting unit to emit light is output at a predetermined frequency in order to emit the distance measurement light for the iToF sensor, so that light emission and extinction are repeated at a predetermined frequency, and the distance measurement light is projected.

In response to this, from time t13 to t14, the iToF sensor performs exposure for receiving reflected light, and a pixel signal corresponding to an amount of the received light is accumulated.

Then, if the light emission of the light emitting unit with respect to the iToF sensor and the exposure by the iToF sensor end at time t14, data processing based on the pixel signals accumulated in the iToF sensor is performed, and a distance measurement result is output (data output) from time t14 to t24.

Furthermore, the light emission of the distance measurement light for the iToF sensor has ended at time t14, and thus, in order to cause the distance measurement light for the dToF sensor to be emitted a trigger (LD light emission trigger (dToF)) for causing the light emitting unit to emit light is output, and the distance measurement light is projected at time t23 which is a timing immediately after (after time t14) the end of the light emission of the distance measurement light for the iToF sensor.

In response to this, from time t23 to t24, the dToF sensor performs exposure for receiving the reflected light, and a pixel signal corresponding to an amount of the received light is accumulated.

Then, if the light emission of the light emitting unit with respect to the dToF sensor and the exposure by the dToF sensor end at time t24, data processing based on the pixel signals accumulated in the dToF sensor is performed, and a distance measurement result is output from time t24 to t16.

In this manner, the projection of the distance measurement light to the iToF sensor and the projection of the distance measurement light to the dToF sensor are alternately repeated, and the data processing is performed on the pixel signal of the iToF sensor within a period in which the distance measurement light to the dToF sensor is projected, thereby the distance measurement result is output, and the data processing is performed on the pixel signal of the dToF sensor within a period in which the distance measurement light to the iToF sensor is projected, thereby the distance measurement result is output.

Here, regarding the light emission (light projection) of the distance measurement light in the dToF sensor and the exposure, as illustrated in the upper right part of FIG. 15, the exposure and the light emission are repeated within the exposure period, so that a noise countermeasure is taken and a histogram is generated.

In other words, the upper right part of FIG. 15 illustrates a state where a light emission trigger (dToF) is output at time t31, t32, . . . tn at predetermined time intervals within the exposure period enclosed by a one-dot chain line, and exposure Ex1, Ex2, . . . Exn for a predetermined period is repeatedly performed from the corresponding timing. Note that the light emission trigger (dToF) has a lower frequency than a frequency of the light emission trigger (iToF).

(Operation of i/d ToF Sensor of the Present Disclosure in which iToF Sensor and dToF Sensor are Integrated)

On the other hand, in a case of the i/d ToF sensor 201 in FIG. 6 to which the technology of the present disclosure is applied, operation is illustrated in a timing chart as illustrated in the lower part of FIG. 15.

Note that the timing chart illustrated in the lower part of FIG. 15 illustrates, from the top, processing related to exposure and data output in the i/d ToF sensor, a light emission trigger for causing the light emitting unit 203 to emit light, and switching of light emission setting, that is, whether the light emitting unit 203 has light emission setting for the iToF block 232 or light emission setting for the dToF block 231.

In other words, at time t0, the control unit 221 switches the light emission setting controlled by the light emission timing control unit 224 to the light emission setting for the iToF block 232. In response to this, the light emission timing control unit 224 outputs, to the LD 202, LD communication indicating switching to the light emission setting for the iToF block 232. The LD 202 adjusts a light emission state of the light emitting unit 203 on the basis of the light emission setting for the iToF block 232 notified through the LD communication. Here, the light emission setting for the iToF block 232 is, for example, setting for emitting light with light emission intensity of a normal level.

Then, from time t50 to t51, the light emission timing control unit 224 outputs the light emission trigger (iToF) for causing the light emitting unit 203 to emit light to the LD 202 so that the light emitting unit 203 emits light with the light emission setting for the iToF block 232.

As a result, the light emitting unit 203 repeatedly emits and turns off light with normal light emission intensity and at a predetermined frequency and projects the distance measurement light to the iToF block 232.

In response to this, from time t50 to t51, the iToF block 232 performs exposure for receiving the reflected light and outputs a pixel signal corresponding to an amount of the received light, to the dToF data processing unit 261 of the data processing unit 225.

More specifically, the iToF control unit 252 controls the iToF pixel region 251 to receive reflected light generated by reflection of the distance measurement light by an object and output a pixel signal corresponding to an amount of the received light.

The pixel modulation unit 253 modulates the pixel signal output from the iToF pixel region 251 and outputs the modulated pixel signal to the ADC 254.

The analog digital converter (ADC) 254 converts the pixel signal modulated by the pixel modulation unit 253 from an analog signal to a digital signal and outputs the digital signal to the data processing unit 225.

Then, at time t51, the light emission timing control unit 224 stops outputting the light emission trigger (iToF) for causing the light emitting unit 203 to emit light to the LD 202. As a result, the light emitting unit 203 stops emitting light and is turned off, so that projection of the distance measurement light is stopped.

From time t51 to time t52, the iToF data processing unit 262 of the data processing unit 225 performs data processing on the data of the pixel signal supplied from the iToF block 232, calculates a distance for each pixel and outputs the distance.

More specifically, the data processing unit 291 of the iToF data processing unit 262 performs various kinds of processing such as binning processing, filtering processing, and error determination processing on the data based on the pixel signal supplied from the iToF block 232 of the pixel block 223 and outputs the data to the distance measurement calculation unit 292.

The distance measurement calculation unit 292 performs the processing described with reference to FIG. 8 on the data subjected to various kinds of processing by the data processing unit 291 to calculate a distance and outputs the distance to the output IF 226.

Furthermore, at time t51, the control unit 221 switches the light emission setting controlled by the light emission timing control unit 224 to the light emission setting for the dToF block 231. The light emission timing control unit 224 outputs LD communication indicating switching to the light emission setting for the dToF block 231 to the LD 202. The LD 202 adjusts a light emission state of the light emitting unit 203 on the basis of the light emission setting for the dToF block 231 notified through the LD communication.

Here, the light emission setting for the dToF block 231 is, for example, setting to set the light emission intensity to be higher than the light emission intensity in the light emission setting for the iToF block 232.

Then, at time t61, the light emission timing control unit 224 outputs the light emission trigger (dToF) for causing the light emitting unit 203 to emit light to the LD 202.

As a result, for example, the light emitting unit 203 emits light with light emission intensity higher than the light emission intensity in the light emission setting for the iToF block 232 and projects the distance measurement light to the dToF block 231.

In response to this, from time t61 to t52, the dToF block 231 performs exposure for receiving the reflected light and outputs a pixel signal corresponding to an amount of the received light to the dToF data processing unit 261 of the data processing unit 225.

More specifically, the dToF control unit 242 controls the dToF pixel region 241 to receive reflected light generated by reflection of the distance measurement light by an object and output a pixel signal corresponding to an amount of the received light.

The sampling processing unit 243 performs sampling processing on the pixel signal output from the dToF pixel region 241 and outputs a sampling result to the data processing unit 225.

Then, at time t52, the light emission timing control unit 224 stops outputting the light emission trigger (dToF) for causing the light emitting unit 203 to emit light to the LD 202. As a result, the light emitting unit 203 stops emitting light and is turned off, so that projection of the distance measurement light is stopped.

From time t52 to t53, the dToF data processing unit 261 of the data processing unit 225 processes data of the pixel signal supplied from the dToF block 231, calculates a distance for each pixel and outputs the distance.

More specifically, the histogram generation unit 281 generates a histogram from the sampling result supplied from the dToF block 231 of the pixel block 223 and outputs the histogram to the distance calculation unit 271.

The distance calculation unit 282 calculates a distance on the basis of the histogram supplied from the histogram generation unit 281 using the method described with reference to FIG. 7 and outputs the distance to the output IF 226.

On the other hand, light emission of the distance measurement light with respect to the dToF block 231 has ended at time t52, and thus, the control unit 221 switches the light emission setting controlled by the light emission timing control unit 224 to the light emission setting for the iToF block 232 at a timing immediately after the end (after the time t52). The light emission timing control unit 224 outputs LD communication indicating switching to the light emission setting for the iToF block 232 to the LD 202. The LD 202 adjusts a light emission state of the light emitting unit 203 on the basis of the light emission setting for the iToF block 232 notified through the LD communication.

Then, at time t62, in order to emit the distance measurement light for the iToF block 232, the light emission timing control unit 224 outputs a light emission trigger (iToF) for causing the light emitting unit 203 to emit light to project the distance measurement light.

In response to this, from time t62 to t53, the iToF block 232 performs exposure for receiving the reflected light and generates a pixel signal corresponding to an amount of the received light.

Then, if the light emission of the light emitting unit to the iToF sensor and the exposure by the iToF sensor end at time t53, data processing based on the pixel signals accumulated in the iToF block 232 is performed from time t53 to t54, and a distance measurement result is output.

Furthermore, the light emission of the distance measurement light to the iToF block 232 has ended at time t53, and thus, the control unit 221 switches the light emission setting controlled by the light emission timing control unit 224 to the light emission setting for the dToF block 231 at a timing immediately after the end (after the time t53). The light emission timing control unit 224 outputs LD communication indicating switching to the light emission setting for the dToF block 231 to the LD 202. The LD 202 adjusts a light emission state of the light emitting unit 203 on the basis of the light emission setting for the dToF block 231 notified through the LD communication.

Then, at time t63, the light emission timing control unit 224 outputs a light emission trigger (dToF) for causing the light emitting unit 203 to emit light in order to emit the distance measurement light for the dToF block 231 and causes the light emitting unit 203 to emit light.

In response to this, from time t63 to t54, the dToF block 231 performs exposure for receiving the reflected light and accumulates a pixel signal corresponding to an amount of the received light.

Then, if the light emission of the light emitting unit 203 to the dToF block 231 and the exposure by the dToF block 231 end at time t54, data processing is performed on the basis of the pixel signal supplied from the dToF block 231, and a distance measurement result is output from time t54 to t55.

Furthermore, the light emission of the distance measurement light to the dToF block 231 has ended at time t54, and thus, the control unit 221 switches the light emission setting controlled by the light emission timing control unit 224 to the light emission setting for the iToF block 232 at a timing immediately after the end (after time t54). The light emission timing control unit 224 outputs LD communication indicating switching to the light emission setting for the iToF block 232 to the LD 202. The LD 202 adjusts a light emission state of the light emitting unit 203 on the basis of the light emission setting for the iToF block 232 notified through the LD communication.

In response to this, from time t64 to t55, the iToF block 232 performs exposure for receiving the reflected light and outputs a pixel signal corresponding to an amount of the received light.

Then, at time t55, if the light emission of the light emitting unit to the iToF block 232 and the exposure by the iToF block 232 end, from time t55 to t56, data processing based on the pixel signals accumulated in the iToF block 232 is performed, and a distance measurement result is output.

In this manner, the projection of the distance measurement light to the iToF block 232 and the projection of the distance measurement light to the dToF block 231 are alternately repeated while respective light emission settings are switched, and during a period in which the distance measurement light for the dToF block 231 is projected, data processing is performed on the pixel signal of the iToF block 232, thereby the distance measurement result is output, and during a period in which the distance measurement light for the iToF block 232 is projected, data processing is performed on the pixel signal of the dToF block 231, thereby the distance measurement result is output.

Through the above-described processing, by providing the dToF block 231 capable of measuring a long distance and the iToF block 232 capable of measuring a short distance with high accuracy, it is possible to measure a short distance and a long distance in a time division manner.

Figure 16:
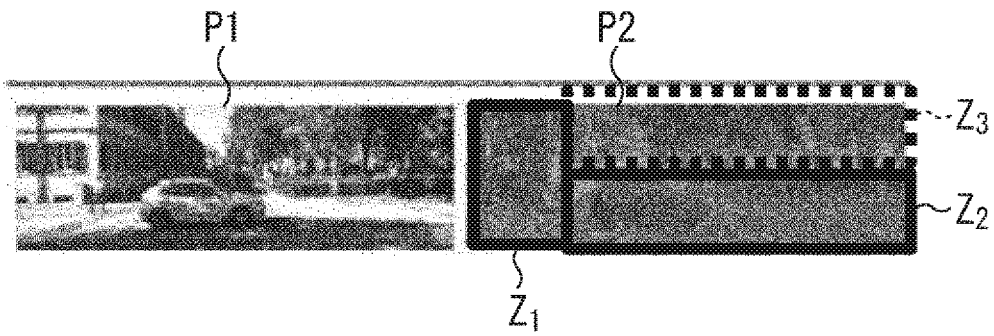
FIG. 16 is a view for explaining an example of a depth image obtained from a distance measurement result by the distance measuring device in FIG. 6.

As a result, for example, in a case where a vehicle exists in front of the center in the image, a road extends behind the vehicle, and distance measurement is performed in a space in which a front-rear direction is relatively close to the vehicle as indicated by an image P1 in FIG. 16, regions Z1 and Z2 are relatively short distance ranges as indicated by an image P2 in FIG. 16, so that it is possible to improve distance measurement accuracy as a whole by using a distance measurement result by the iToF block 232 and using a distance measurement result by the dToF block 231 for a region Z3 including a relatively long distance range.

In addition, it is possible to share and use the light emission timing control unit 224, the LD 202, and the light emitting unit 203 by switching different light emission settings for each of the dToF block 231 and the iToF block 232 in a time division manner, so that it is possible to reduce cost and complexity of control by reducing the number of components.

Furthermore, processing in the dToF block 231 and the iToF block 232 is performed in a time division manner, and thus, only one of the processing results is always output, so that it is possible to use the output IF 226 in common and reduce device cost.

Variations of Light Emission Settings

Figure 17:
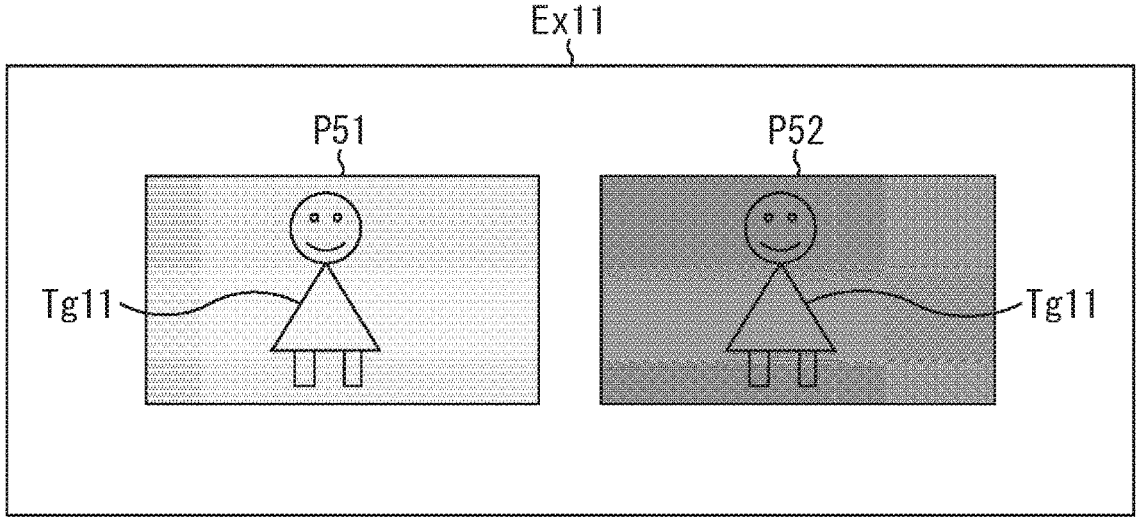
FIG. 17 is a view for explaining an example of light emission setting.
Figure 17:
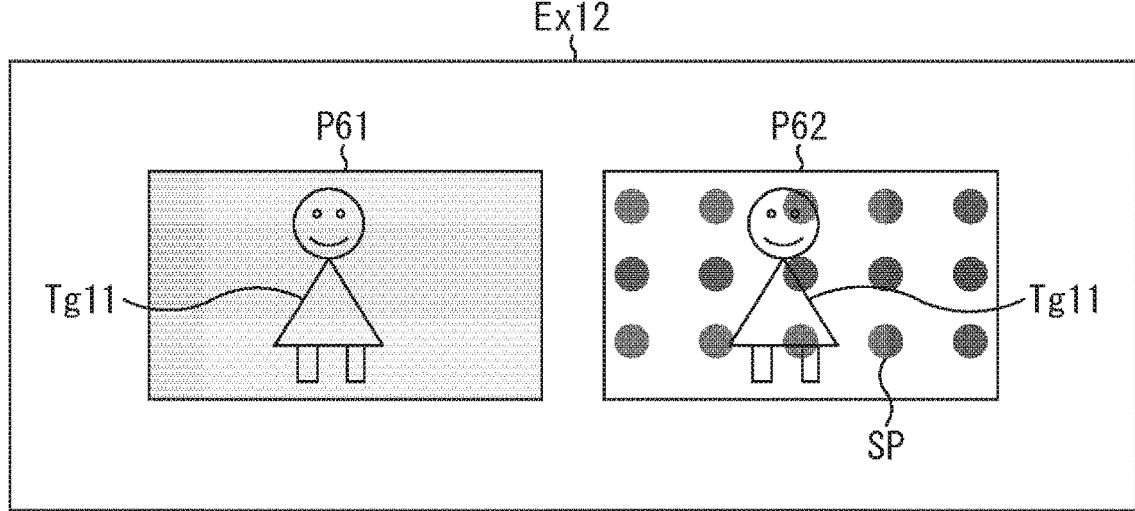
Figure 17:
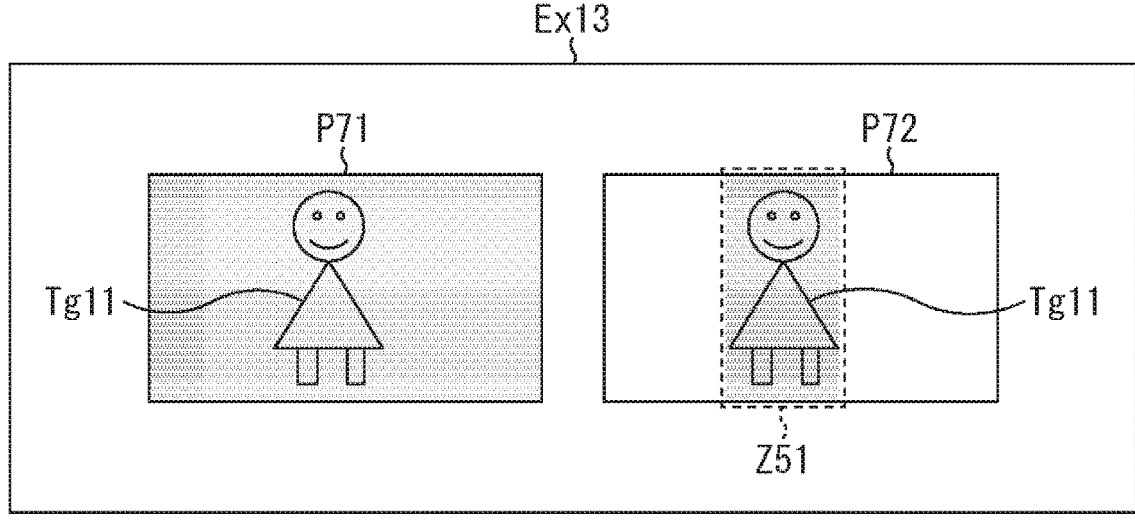

In the above description, an example has been described in which in the light emission setting for the dToF block 231 and the light emission setting for the iToF block 232, normal light emission intensity is set as illustrated in the example Ex11 of FIG. 17, in the light emission setting for the iToF block 232, normal light emission intensity is set as illustrated in the image P51, and in the light emission setting for the dToF block 231, intensity higher than the normal light emission intensity is set as illustrated in the image P52. Note that, in the images P51 and P52 of FIG. 17, there is an object Tg11 to be measured.

However, in the light emission setting for the dToF block 231 and the light emission setting for the iToF block 232, other settings may be made.

For example, as illustrated in an example Ex12 of FIG. 17, in the light emission setting for the iToF block 232, normal light emission intensity may be set as illustrated in an image P61, and in the light emission setting for the dToF block 231, settings may be made to emit light as spot light SP brighter than predetermined light emission intensity as illustrated in an image P62.

In other words, the dToF block 231 emits light for distance measurement at a long distance, and thus, distance measurement at a longer distance is implemented by using the spot light SP having higher light emission intensity in consideration of diffusion at a long distance.

A pattern of the spot light SP may be a pattern other than the image P62 in FIG. 17.

Furthermore, for example, as indicated by an example Ex13 in FIG. 17, while in the light emission setting for the iToF block 232, normal light emission intensity is set as indicated by an image P71, and in the light emission setting for the dToF block 231, normal light emission intensity is set as indicated by an image P72, light may be emitted so as to irradiate only a region near the object Tg11 to be measured, in a similar manner to the iToF block 232.

Note that a pattern of the region irradiated with the distance measurement light by the light emitting unit 203 may be a pattern other than the image P72.

Furthermore, while in the above description, an example has been described in which one LD 202 and one light emitting unit 203 are provided, the LDs 202 corresponding to the light emission settings of the iToF block 232 and the dToF block 231 may be individually provided, and only the light emitting unit 203 may be shared.

Variations of Switching Pattern of Light Emission Settings (Fixed Pattern)

Figure 18:
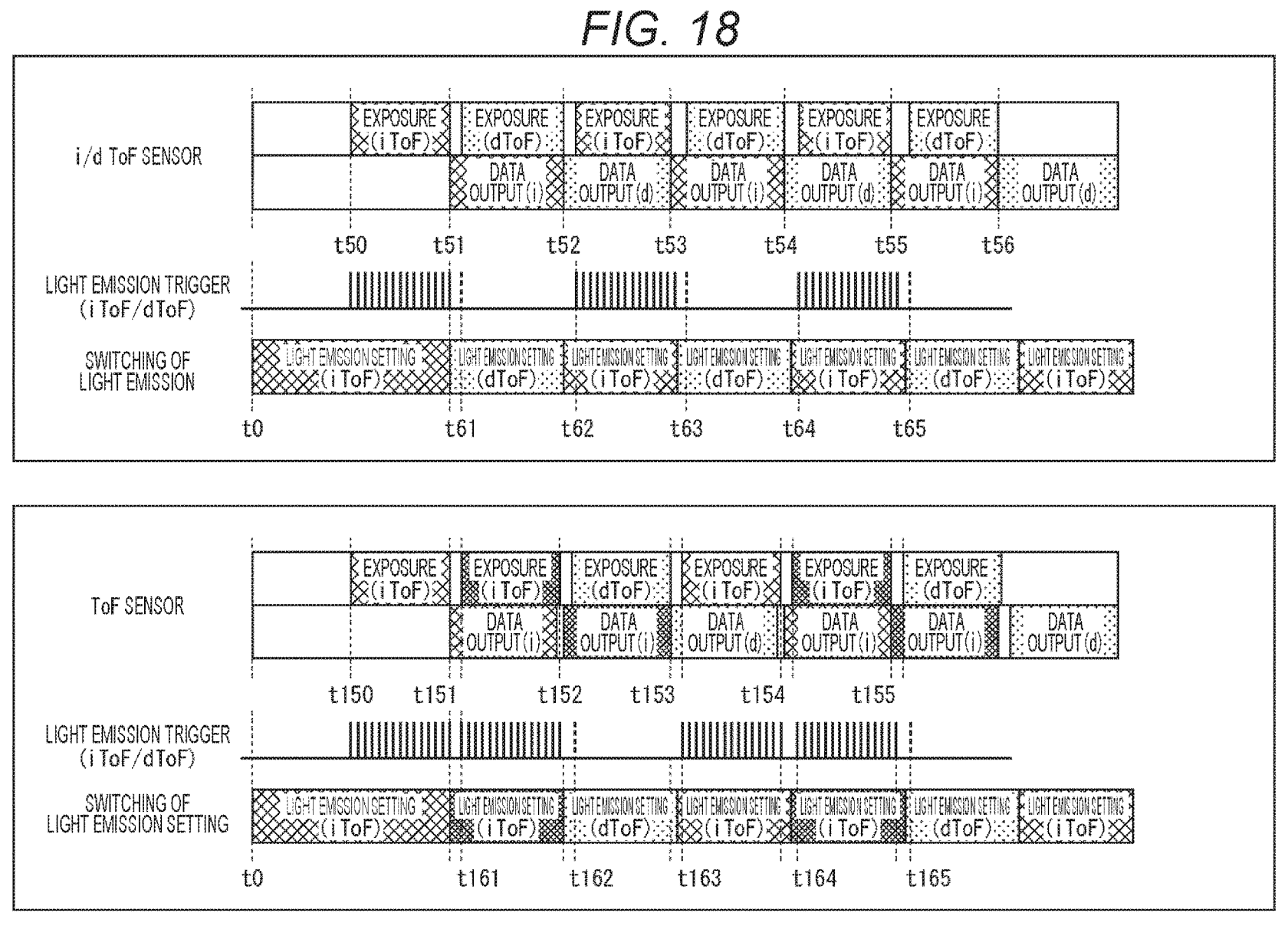

In the above, as illustrated in an upper part of FIG. 18, an example has been described in which the exposure, the data output, the light emission trigger, and the light emission setting in the dToF block 231 and the iToF block 232 in the i/d ToF sensor 201 are alternately repeated in the dToF block 231 and the iToF block 232.

However, the exposure, the data output, the output of the light emission trigger, and the light emission setting do not necessarily have to be alternately repeated, and other patterns may be employed as long as a fixed pattern is repeated.

In other words, for example, the exposure, the data output, the output of the light emission trigger, and the light emission setting may be repeated in a pattern of order of the iToF block 232, the iToF block 232, and the dToF block 231.

In other words, in a lower part of FIG. 18, the light emission setting (for the light emission setting, from time t0), the output of the light emission trigger, and the exposure for the iToF block 232 may be performed from time t150 to t151, the light emission setting, the output of the light emission trigger, and the exposure for the iToF block 232 may be performed from time t161 to t152, and the light emission setting, the output of the light emission trigger, and the exposure for the dToF block 231 may be performed from time t162 to t153. In other words, a fixed pattern may be used in which light emission setting and exposure for each of the iToF block 232, the iToF block 232, and the dToF block 231 are repeated in this order.

Here, data output by the iToF data processing unit 262 is performed from time t161 to t152, data output by the iToF data processing unit 262 is performed from time t162 to t153, data output by the dToF data processing unit 261 is performed from time t163 to t154, and data output is repeated in the order of the iToF data processing unit 262, the iToF data processing unit 262, and the dToF data processing unit 261 in a similar manner thereafter.

(Variable Pattern)

Figure 19:
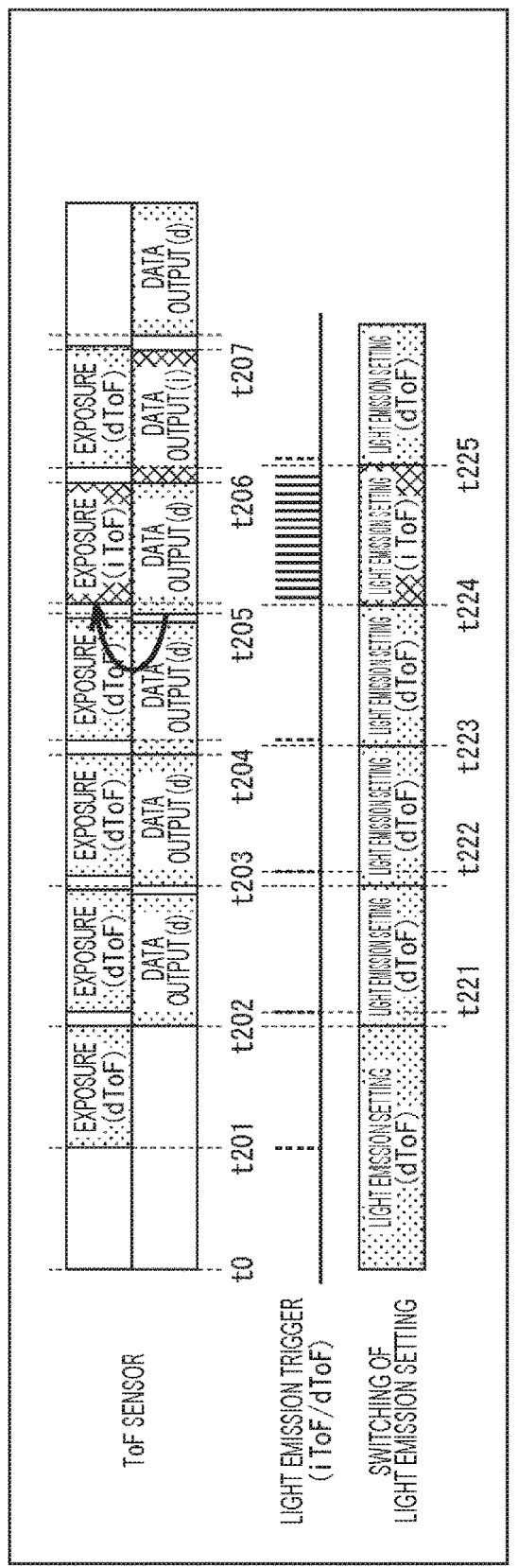
FIG. 19 is a timing chart for explaining still another operation of the distance measuring device in FIG. 6.

Furthermore, while in the above, as illustrated in an upper part of FIG. 19, an example has been described in which the light emission setting is switched by a fixed pattern, a switching pattern of the light emission setting may be variable.

For example, normally, the light emission setting by the dToF block 231 may be performed so as to perform distance measurement at a long distance, and the light emission setting by the iToF block 232 may be performed only at a timing at which an object passes through a short distance.

In other words, the lower part of FIG. 19 illustrates an example of a timing chart where the light emission setting is basically performed by the dToF block 231, but, for example, the light emission setting is performed by the iToF block 232 at a timing at which it is found that an object passes through a short distance.

In other words, in the lower part of FIG. 19, it is assumed that data is output by the iToF block 232 and the iToF data processing unit 262 from time t0 to time t205 and from time t221 to time t224.

Here, for example, in a case where it is detected that an object passes through a relatively short distance at time t205, the light emission setting, the output of the light emission trigger, and the exposure are performed on the iToF block 232 from time t224 to t206, and data is output by the iToF data processing unit 262 from time t206 to t207.

Such processing makes it possible to normally measure a distance of an object at a long distance, and only in a case where approach of the object is recognized from the distance measurement result, measure a distance of an object at a short distance with high accuracy.

As a result, it is possible to implement efficient distance measurement.

3. Second Embodiment

While in the above description, an example has been described in which the iToF pixel region 251 is provided in the iToF block 232 in the pixel block 223 in order to implement distance measurement of a short distance, a normal pixel region including normal pixels may be used instead of the iToF pixel region 251.

Figure 20:
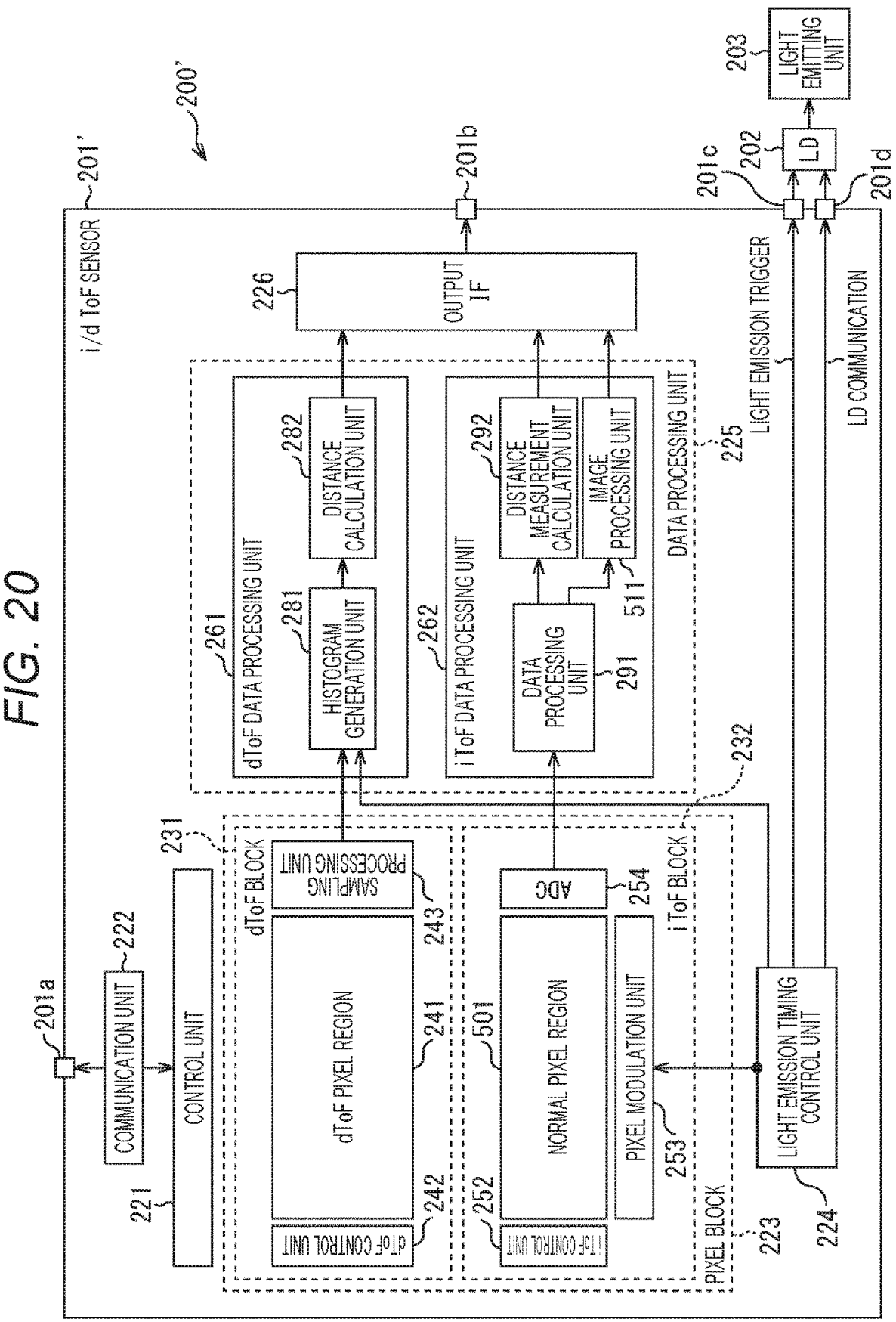
FIG. 20 is a view for explaining a configuration example of a second embodiment of the distance measuring device of the present disclosure.

FIG. 20 illustrates a configuration example of an i/d ToF sensor 201' of a distance measuring device 200' in which a normal pixel region is provided instead of the iToF pixel region 251.

Note that, in the i/d ToF sensor 201' in FIG. 20, components having the same functions as those of the i/d ToF sensor 201 in FIG. 6 are denoted by the same reference numerals, and description thereof will be appropriately omitted.

The i/d ToF sensor 201' in FIG. 20 is different from the i/d ToF sensor 201 in FIG. 6 in that a normal pixel region 501 is provided in the iToF block 232 instead of the iToF pixel region 251, and an image processing unit 511 is newly provided in the iToF data processing unit 262.

In other words, the normal pixel region 501 including the normal pixels can implement the same functions as functions of the iToF pixel region 251 and can also capture and output a normal image.

The normal pixel region 501 has a mode in which the normal pixel region 501 functions as an iToF pixel region and a mode in which the normal pixel region 501 functions as a normal pixel region and outputs a processing result by switching the mode by time division processing.

The image processing unit 511 performs image processing using a pixel signal output in the mode in which the normal pixel region 501 functions as a normal pixel region and outputs the processed signal as a normal image signal to the output IF 226.

Figure 21:
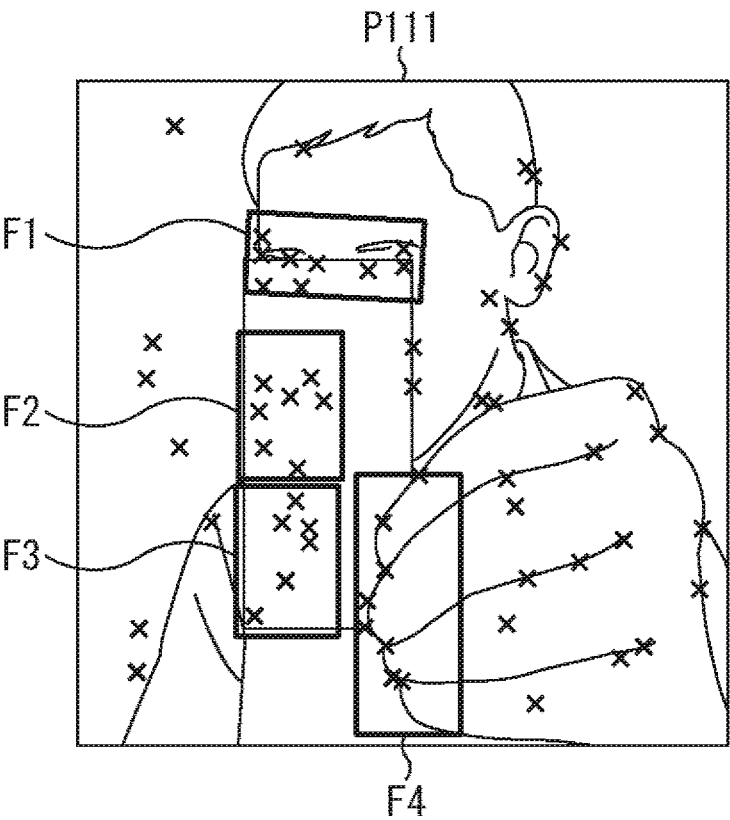
FIG. 21 is a view for explaining a first application example of a distance measurement result by the distance measuring device in FIG. 20.

With such a configuration, for example, as illustrated in FIG. 21, in the image P11, a feature amount recognized using information output as the normal image and the distance measurement result can be associated with each other, and, for example, feature amounts of the same distance measurement result can be grouped and displayed.

In other words, in an image P111 of FIG. 21, by using positions where feature amounts indicated by cross marks are detected and distance measurement results, regions where feature points having the same distance measurement result gather are grouped and displayed as frames F1 to F4.

In other words, the image P111 of FIG. 21 indicates that the same distance measurement results are obtained for cross marks indicating the feature points included in each of the frames F1 to F4.

Figure 22:
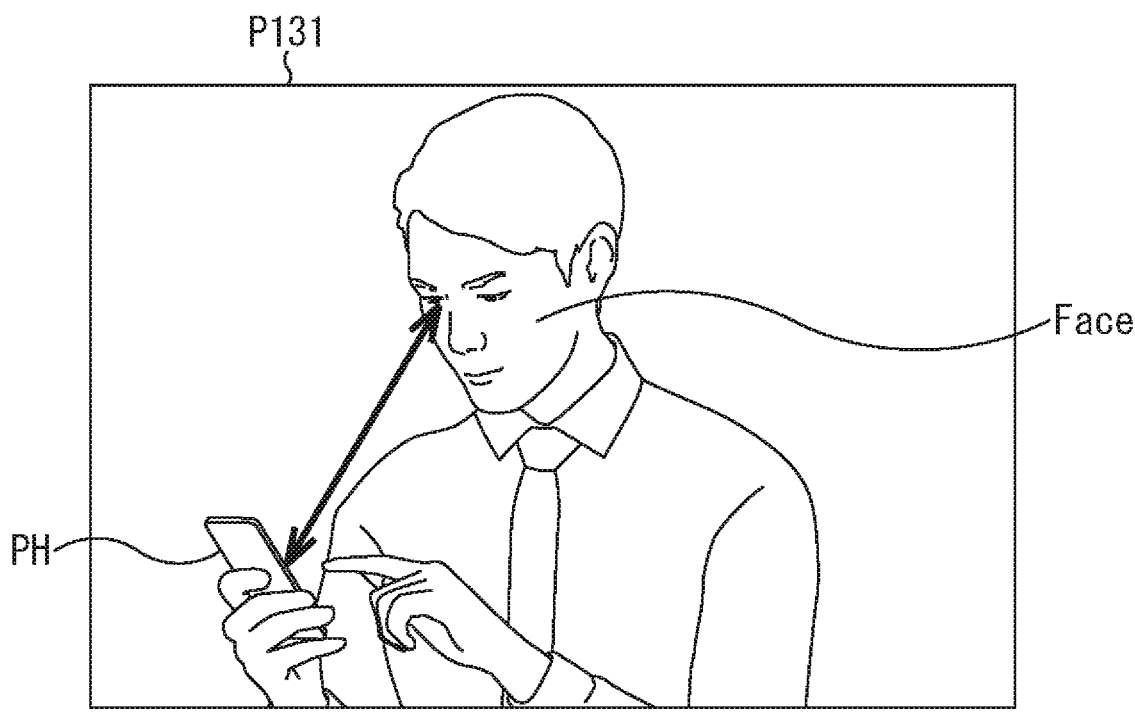
FIG. 22 is a view for explaining a second application example of a distance measurement result by the distance measuring device in FIG. 20.

Furthermore, as illustrated in FIG. 22, by the distance measuring device being provided in an imaging device such as a smartphone PH, user authentication with higher authentication accuracy may be achieved by image recognition of the user's face captured from an image and unevenness recognition using unevenness of the user's face by a distance measurement result.

Variations of Pixel Block

While in the above description, the example has been described in which the dToF block 231 and the iToF block 232 are arranged vertically in the pixel block, the dToF pixel region 241 and the iToF pixel region 251 may be alternately arranged in units of a predetermined sequence.

Figure 23:
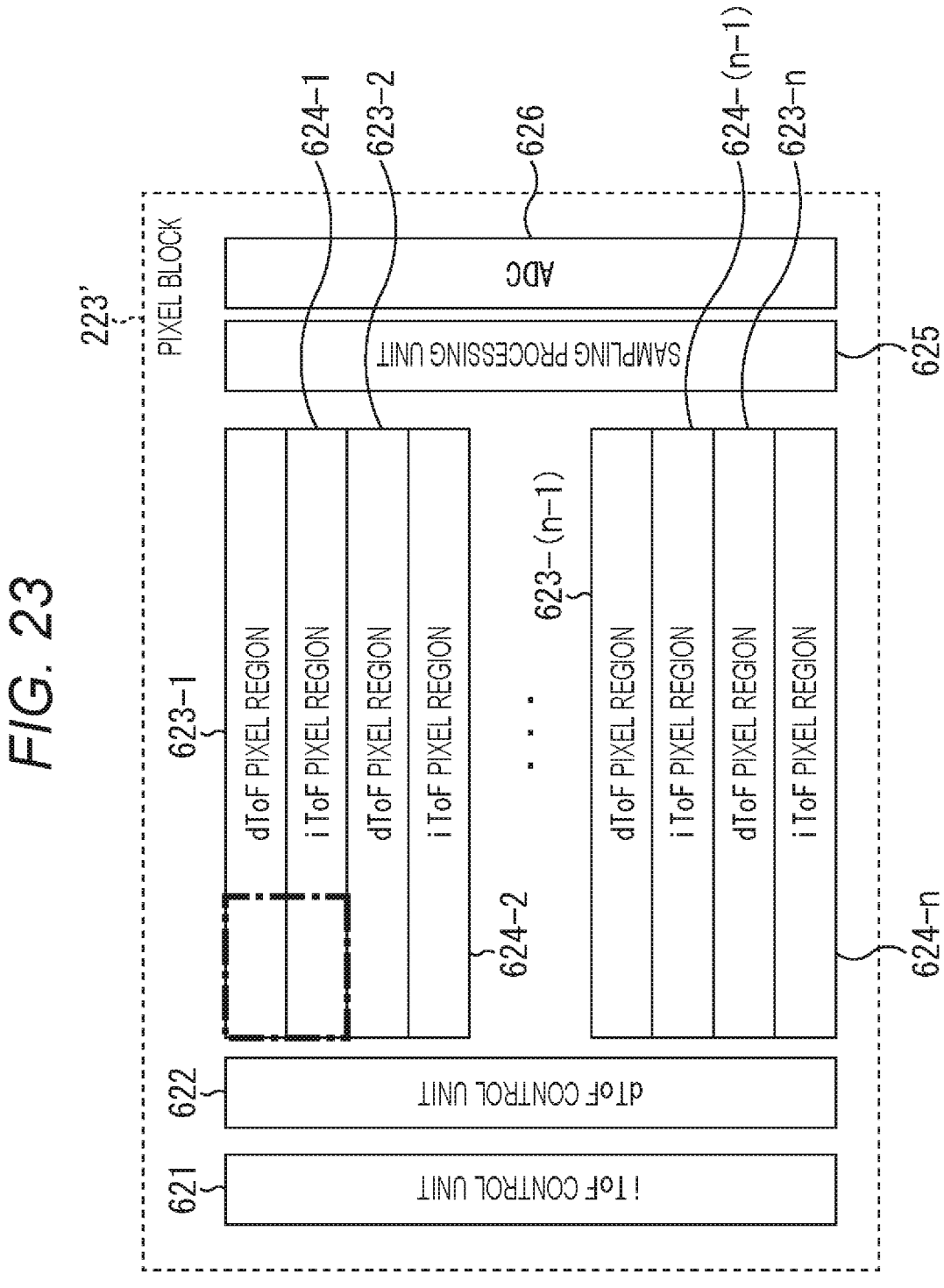
FIG. 23 is a view for explaining an example of variations of the i/d ToF sensor.

FIG. 23 illustrates a configuration example of the pixel block 601 in which the dToF pixel region 241 and the iToF pixel region 251 are alternately arranged in units of a predetermined sequence.

In the pixel block 601, dToF pixel regions 623-1 to 623-*n* and iToF pixel regions 624-1 to 624-*n* are alternately constituted. Note that the dToF pixel regions 623-1 to 623-*n* and the iToF pixel regions 624-1 to 624-*n* will be simply referred to as a dToF pixel region 623 and an iToF pixel region 624, respectively, unless otherwise distinguished.

In other words, a predetermined number of columns of the dToF pixel region 623 and a predetermined number of columns of the iToF pixel region 624 are alternately arranged.

Furthermore, the number of columns and a size of the dToF pixel region 623 do not have to be the same as the number of columns and a size of the iToF pixel region 624.

Figure 24:
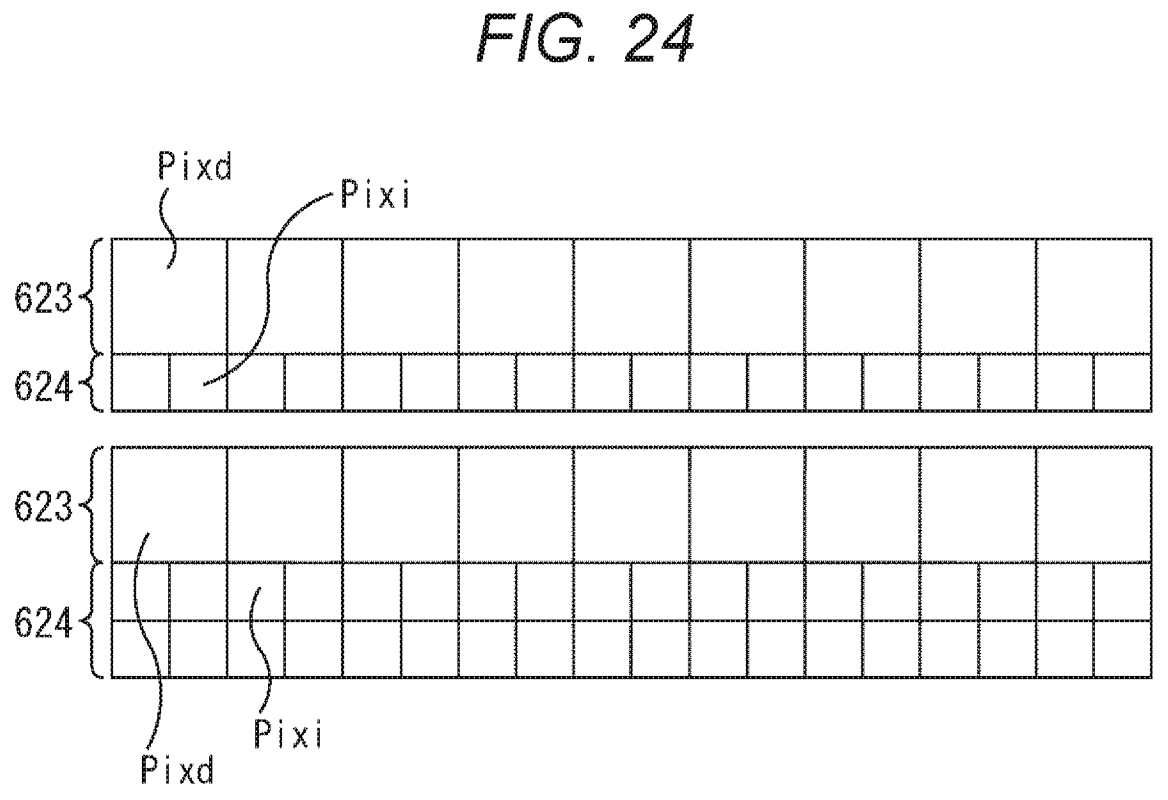

In other words, for example, in a range enclosed by an alternate long and short dash line in FIG. 23, for example, as illustrated in an upper part of FIG. 24, in a case where a size of a pixel Pixi of the iToF pixel region 624 is horizontal direction×vertical direction=2×2 times a size of a pixel Pixd of the dToF pixel region 623, the pixels Pixi of the iToF pixel region 624 of the number twice the number of the pixels Pixd of the dToF pixel region 623 may be arranged in the horizontal direction so as to be alternately arranged in the vertical direction.

Furthermore, as illustrated in a lower part of FIG. 24, the pixels Pixi and the pixels Pixd may be alternately arranged in a state where the pixels Pixi of the iToF pixel region 624 of the number twice the number of the pixels Pixd of the dToF pixel region 623 are arranged in each of the horizontal direction and the vertical direction.

Note that an iToF control unit 621, a dToF control unit 622, a sampling processing unit 645, and an ADC 646 have configurations respectively corresponding to the configurations of the iToF control unit 252, the dToF control unit 242, the sampling processing unit 243, and the ADC 254 in FIG. 6.

Application Example 1

The example in which the distance measurement results obtained by the dToF block 231 and the dToF data processing unit 261 and the distance measurement results obtained by the iToF block 232 and the iToF data processing unit 262 are output together has been described above.

However, a deapth map may be further generated and output, a distance measurement unnecessary range may be determined on the basis of the depth map, and distances may be measured in only a range other than the distance measurement unnecessary range and output as the depth map on the basis of the determination result.

Here, the unnecessary region is, for example, a region to which a distance is longer than a predetermined distance in the depth map. In other words, a region within an image in which there is no object requiring distance measurement within a predetermined distance and processing based on object detection is unnecessary may be set as the unnecessary region. Note that the unnecessary region is not limited thereto and may be defined as a region within an image at various distances.

Figure 25:
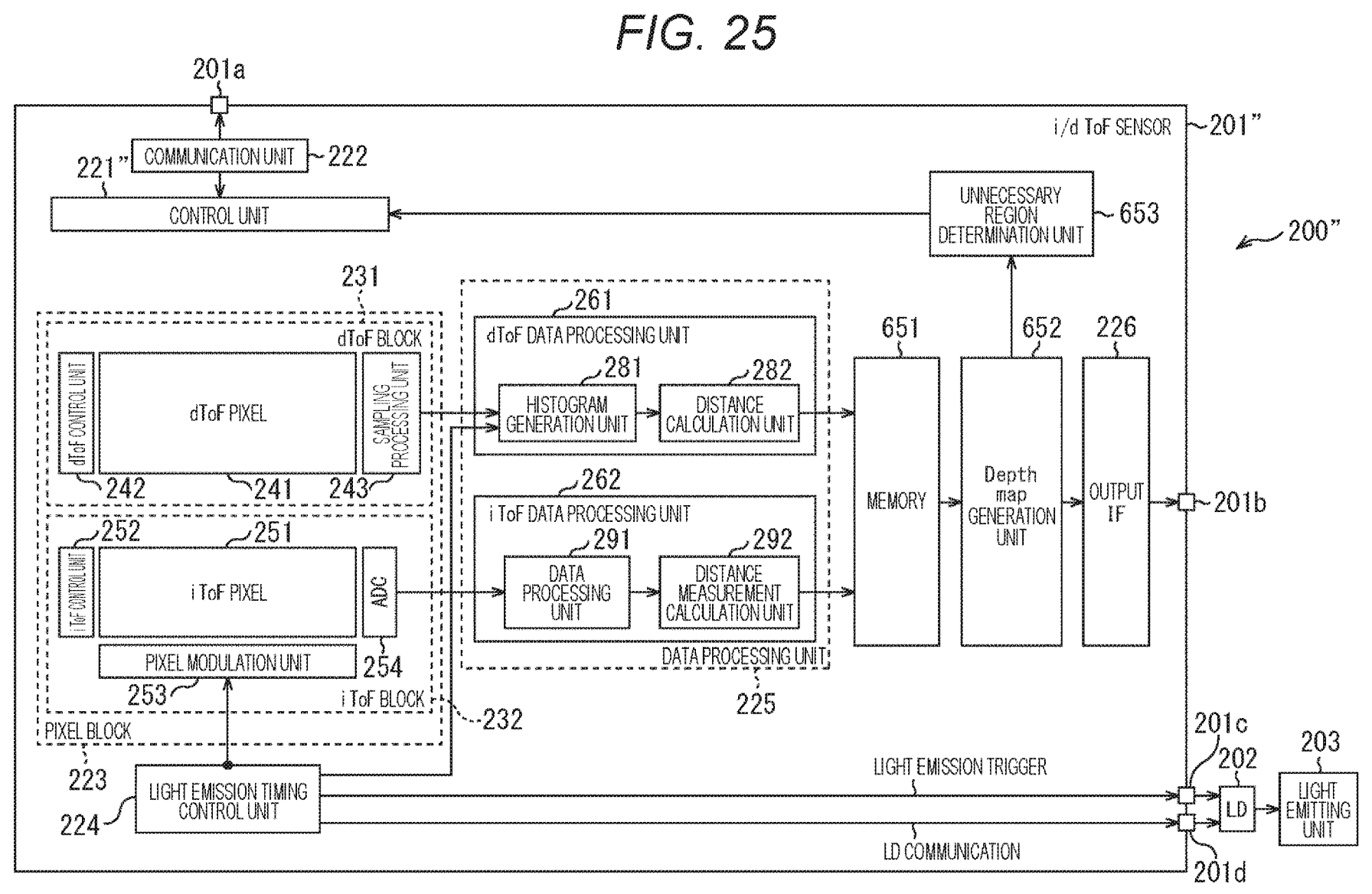

FIG. 25 illustrates a configuration example of an i/d ToF sensor 201" of a distance measuring device 200" in which distance measurement results obtained by the dToF block 231 and the dToF data processing unit 261 and the distance measurement results obtained by the iToF block 232 and the iToF data processing unit 262 are output together, a deapth map is further generated and output, the distance measurement unnecessary range is determined on the basis of the depth map, and distances are measured in only a range other than the distance measurement unnecessary range on the basis of the determination result and output as the depth map.

Note that, in the i/d ToF sensor 201" in FIG. 25, components having the same functions as those of the i/d ToF sensor 201 in FIG. 6 are denoted by the same reference numerals, and description thereof will be appropriately omitted.

The i/d ToF sensor 201" in FIG. 25 is different from the i/d ToF sensor 201 in FIG. 6 in that a memory 651, a depth map generation unit 652, and an unnecessary region determination unit 653 are newly provided, processing based on information on an unnecessary region from the unnecessary region determination unit 653 is performed, and a control unit 221" is provided instead of the control unit 221.

The memory 651 temporarily stores the distance measurement results obtained by the dToF block 231 and the dToF data processing unit 261 and the distance measurement results obtained by the iToF block 232 and the iToF data processing unit 262.

The deapth map generation unit 652 uses the distance measurement results obtained by the iToF block 232 and the iToF data processing unit 262 for the distance measurement results for a shorter distance than a predetermined distance among the distance measurement results obtained by the dToF block 231 and the dToF data processing unit 261 and the distance measurement results obtained by the iToF block 232 and the iToF data processing unit 262 stored in the memory 651, and uses the distance measurement results obtained by the dToF block 231 and the dToF data processing unit 261 for the distance measurement results for a longer distance than the predetermined distance to generate a deapth map and outputs the deapth map to the output IF 226 and the unnecessary region determination unit 653.

The unnecessary region determination unit 653 determines an unnecessary region on the basis of the depth map and outputs a determination result to the control unit 221".

For example, in a case where a region to which a distance is longer than a predetermined distance in the depth map is set as the unnecessary region, the unnecessary region determination unit 653 extracts information on a region to which a distance is longer than the predetermined distance in the depth map as information of the unnecessary region and outputs the information to the control unit 221" as a determination result.

The control unit 221" controls the pixel block 223 on the basis of the information on the unnecessary region supplied from the unnecessary region determination unit 653 so as to obtain the distance measurement result in a region other than the unnecessary region in the dToF pixel region 241 and the iToF pixel region 251 of each of the dToF block 231 and the iToF block 232.

With such a configuration, distance measurement processing in the unnecessary region can be omitted, so that it is possible to reduce unnecessary processing load and improve processing speed.

Application Example 2

While in the above, the example has been described in which the pixels of the dToF pixel region 241 and the iToF pixel region 251 are arranged in an array, for example, pixels may be arranged in a line and may be rotated with respect to a vertical direction with respect to a line that is an arrangement direction of the pixels to implement distance measurement of the surroundings.

Figure 26:
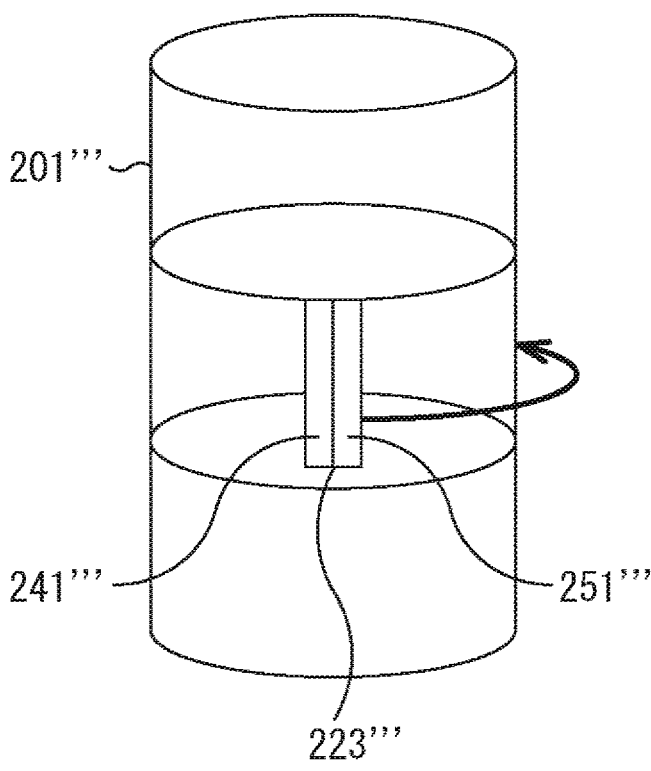
FIG. 26 is a view for explaining a second application example of the distance measuring device of the present disclosure.

FIG. 26 illustrates an appearance example of an i/d ToF sensor 201''' in which pixels of the dToF pixel region 241 and the iToF pixel region 251 are arranged in a line.

In other words, as illustrated in FIG. 26, the i/d ToF sensor 201''' has a cylindrical exterior, and a pixel block 223''' in which a pixel region 241''' in which pixels corresponding to pixels of the dToF pixel region 241 are arranged in a line and a pixel region 251''' in which pixels corresponding to pixels of the iToF pixel region 251 are arranged in a line are arranged adjacent to each other is provided on a cylindrical exterior surface.

The cylindrical i/d ToF sensor 201''' rotates in an arrow direction in the drawing, so that the pixel block 223''' rotates by 360 degrees, so that it is possible to implement distance measurement in a direction of 360 degrees in time series.

With the i/d ToF sensor 201''' in FIG. 26, the pixel block 223''' can implement distance measurement only by driving pixels in units of lines, so that it is possible to reduce power consumption for driving the pixels, and, further, the number of pixels to be driven is small, so that it is possible to improve processing speed for distance measurement by pixels arranged in units of lines.

In the present specification, a system means a set of a plurality of components (such as devices and modules (parts)), and it does not matter whether or not all the components are in the same housing. Thus, a plurality of devices stored in separate housings and connected via a network and one device in which a plurality of modules is stored in one housing are both systems.

Note that the embodiments of the present disclosure are not limited to the above-described embodiments, and various modifications can be made without departing from the gist of the present disclosure.

For example, the present disclosure can employ a configuration of cloud computing in which one function is shared and processed in cooperation by a plurality of devices via a network.

Furthermore, each step described in the above-described flowchart can be executed by one device or can be shared and executed by a plurality of devices.

Furthermore, in a case where a plurality of kinds of processing is included in one step, the plurality of kinds of processing included in the one step can be executed by one device or can be shared and executed by a plurality of devices.

Note that the present technology can also employ the following configurations.

<1> A distance measuring device including:
    a light emitting unit configured to emit distance measurement light;
    a pixel region including a first pixel to be used for distance measurement using a first time of flight (ToF) scheme and a second pixel to be used for distance measurement using a second ToF scheme; and
    a control unit configured to control the first pixel, the second pixel, and the light emitting unit.

<2> The distance measuring device according to <1>,
in which the first ToF scheme is a direct ToF scheme, and the first pixel includes an avalanche diode, and
the second ToF scheme is an indirect ToF scheme, and the second pixel includes a current assisted photonic demodulator (CAPD) or a normal pixel.

<3> The distance measuring device according to <2>,
in which the control unit
    causes light to be emitted so as to repeat light emission and extinction at a predetermined frequency in a case where the first pixel is exposed, and
    control light emission so that light emission and extinction are repeated at a frequency higher than the predetermined frequency in a case where the second pixel is exposed.

<4> The distance measuring device according to <2>,
in which the control unit
    causes the light emitting unit to emit light with first light emission intensity in a case where the first pixel is exposed, and
    causes the light emitting unit to emit light with second light emission intensity lower than the first light emission intensity in a case where the second pixel is exposed.

<5> The distance measuring device according to <2>,
in which the control unit
    causes the light emitting unit to emit spot light in a case where the first pixel is exposed, and causes the light emitting unit to emit light over an entire surface in a case where the second pixel is exposed.

<6> The distance measuring device according to <2>, in which the control unit causes the light emitting unit to emit light only in a region where an object exists in a case where the first pixel is exposed, and causes the light emitting unit to emit light over an entire surface in a case where the second pixel is exposed.

<7> The distance measuring device according to any one of <1> to <6>, in which the control unit causes each of the first pixel and the second pixel to be exposed in a time division manner.

<8> The distance measuring device according to <7>, in which the control unit causes each of the first pixel and the second pixel to be alternately exposed at a predetermined interval.

<9> The distance measuring device according to <7>, in which the control unit causes each of the first pixel and the second pixel to be exposed in a predetermined order.

<10> The distance measuring device according to <7>, in which the control unit switches exposure between the first pixel and the second pixel in a case where a predetermined condition is satisfied.

<11> The distance measuring device according to <10>, in which the control unit starts exposure of the first pixel and switches exposure to exposure of the second pixel on the basis of a distance measurement result of the first pixel.

<12> The distance measuring device according to <2>, in which the pixel region includes a region where the first pixels are arranged in a concentrated manner and a region where the second pixels are arranged in a concentrated manner.

<13> The distance measuring device according to <2>, in which in the pixel region, the first pixels are arranged in a line, and the second pixels are arranged in a line.

<14> The distance measuring device according to <2>, in which in the pixel region, a line in which the first pixels are arranged and a line in which the second pixels are arranged are alternately arranged.

<15> The distance measuring device according to <2>, in which in the pixel region, a predetermined number of lines in which the first pixels are arranged and a predetermined number of lines in which the second pixels are arranged are alternately arranged.

<16> The distance measuring device according to <2>, in which in the pixel region, lines in which the first pixels are arranged and lines in which the second pixels are arranged are alternately arranged such that the number of lines in which the first pixels are arranged is different from the number of lines in which the second pixels are arranged.

<17> The distance measuring device according to <2>, in which in the pixel region, a size of the first pixel is different from a size of the second pixel.

<18> The distance measuring device according to <1>, further including a depth map generation unit configured to generate a depth map on the basis of a distance measurement result by the first pixel and a distance measurement result by the second pixel.

<19> The distance measuring device according to <18>, further including an unnecessary region determination unit configured to determine an unnecessary region in a distance measurement region by the first pixel and the second pixel on the basis of the depth map.

<20> A distance measuring method of a distance measuring device including:

a light emitting unit configured to emit distance measurement light;

a pixel region including a first pixel to be used for distance measurement using a first time of flight (ToF) scheme and a second pixel to be used for distance measurement using a second ToF scheme; and a control unit configured to control the first pixel, the second pixel, and the light emitting unit, the distance measuring method including:

a step of the control unit controlling the first pixel, the second pixel, and the light emitting unit.

REFERENCE SIGNS LIST 200, 200', 200" Distance measuring device
201, 201', 201", 201''' i/d ToF sensor
202 LD
203 Light emitting unit
221, 221" Control unit
222 Communication unit
223, 223', 223''' Pixel block
224 Light emission timing control unit
225 Data processing unit
226 Output IF
231 dToF block
232 iToF block
241, 241''' dToF pixel region
242 dToF control unit
243 Sampling processing unit
251, 251''' iToF pixel region
252 iToF control unit
253 Pixel modulation unit
254 ADC
261 dToF data processing unit
281 Histogram generation unit
282 Distance calculation unit
291 Data processing unit
292 Distance measurement calculation unit
501 Normal pixel region
511 Image processing unit
621 iToF control unit
622 dToF control unit
623, 623-1 to 623-$n$ dToF pixel region
624, 624-1 to 624-$n$ iToF pixel region
651 Memory
652 Depth map generation unit
653 Unnecessary region determination unit

The invention claimed is:

1. A distance measuring device, comprising:

a light emitting unit configured to emit distance measurement light;

a pixel region including a first pixel to be used for distance measurement based on a first time of flight (ToF) scheme and a second pixel to be used for distance measurement based on a second ToF scheme; and a control unit configured to control the first pixel, the second pixel, and the light emitting unit, wherein
the first ToF scheme is a direct ToF scheme, and the first pixel includes an avalanche diode, and the second ToF scheme is an indirect ToF scheme, and the second pixel includes a current assisted photonic demodulator (CAPD) or a normal pixel.

2. The distance measuring device according to claim 1, wherein the control unit is further configured to:

cause the light to be emitted so as to repeat light emission and extinction at a specific frequency in a case where the first pixel is exposed, and control the light emission so that the light emission and extinction are repeated at a frequency higher than the specific frequency in a case where the second pixel is exposed.

3. The distance measuring device according to claim 1, wherein the control unit is further configured to:

cause the light emitting unit to emit light with first light emission intensity in a case where the first pixel is exposed, and cause the light emitting unit to emit light with second light emission intensity lower than the first light emission intensity in a case where the second pixel is exposed.

4. The distance measuring device according to claim 1, wherein the control unit is further configured to cause the light emitting unit to emit spot light in a case where the first pixel is exposed, and cause the light emitting unit to emit the light over an entire surface in a case where the second pixel is exposed.

5. The distance measuring device according to claim 1, wherein the control unit is further configured to cause the light emitting unit to emit the light only in a region where an object exists in a case where the first pixel is exposed, and cause the light emitting unit to emit the light over an entire surface in a case where the second pixel is exposed.

6. The distance measuring device according to claim 1, wherein the control unit is further configured to cause each of the first pixel and the second pixel to be exposed in a time division manner.

7. The distance measuring device according to claim 6, wherein the control unit is further configured to cause each of the first pixel and the second pixel to be alternately exposed at a specific interval.

8. The distance measuring device according to claim 6, wherein the control unit is further configured to cause each of the first pixel and the second pixel to be exposed in a specific order.

9. The distance measuring device according to claim 6, wherein the control unit is further configured to switch exposure between the first pixel and the second pixel in a case where a specific condition is satisfied.

10. The distance measuring device according to claim 9, wherein the control unit is further configured to start exposure of the first pixel and switches exposure to exposure of the second pixel based on a distance measurement result of the first pixel.

11. The distance measuring device according to claim 1, wherein the pixel region includes a region where a plurality of first pixels are arranged in a concentrated manner and a region where a plurality of second pixels are arranged in a concentrated manner, the plurality of first pixels include the first pixel, and the plurality of second pixels include the second pixel.

12. The distance measuring device according to claim 1, wherein in the pixel region, a plurality of first pixels are arranged in a line, and a plurality of second pixels are arranged in a line, the plurality of first pixels include the first pixel, and the plurality of second pixels include the second pixel.

13. The distance measuring device according to claim 1, wherein in the pixel region, a line in which a plurality of first pixels are arranged and a line in which a plurality of second pixels are arranged are alternately arranged, the plurality of first pixels include the first pixel, and the plurality of second pixels include the second pixel.

14. The distance measuring device according to claim 1, wherein in the pixel region, a specific number of lines in which a plurality of first pixels are arranged and a specific number of lines in which a plurality of second pixels are arranged are alternately arranged, the plurality of first pixels include the first pixel, and the plurality of second pixels include the second pixel.

15. The distance measuring device according to claim 1, wherein in the pixel region, lines in which a plurality of first pixels are arranged and lines in which a plurality of second pixels are arranged are alternately arranged such that a number of lines in which the plurality of first pixels are arranged is different from a number of lines in which the plurality of second pixels are arranged, the plurality of first pixels include the first pixel, and the plurality of second pixels include the second pixel.

16. The distance measuring device according to claim 1, wherein in the pixel region, a size of the first pixel is different from a size of the second pixel.

17. The distance measuring device according to claim 1, further comprising:

a depth map generation unit configured to generate a depth map based on a a distance measurement result by the first pixel and a distance measurement result by the second pixel.

18. The distance measuring device according to claim 17, further comprising:

an unnecessary region determination unit configured to determine an unnecessary region in a distance measurement region by the first pixel and the second pixel based on the depth map.

19. A distance measuring method, comprising:

in a distance measuring device including:

a light emitting unit configured to emit distance measurement light;

a pixel region including a first pixel to be used for distance measurement based on a first time of flight (ToF) scheme and a second pixel to be used for distance measurement based on a second ToF scheme; and a control unit configured to control the first pixel, the second pixel, and the light emitting unit, the distance measuring method comprising:

controlling, by the control unit, the first pixel, the second pixel, and the light emitting unit, wherein the first ToF scheme is a direct ToF scheme, and the first pixel includes an avalanche diode, and the second ToF scheme is an indirect ToF scheme, and the second pixel includes a current assisted photonic demodulator (CAPD) or a normal pixel.

* * * * *